United States Patent [19]

Hidaka

[11] Patent Number: 5,606,712
[45] Date of Patent: Feb. 25, 1997

[54] INFORMATION MANAGING APPARATUS CAPABLE OF UTILIZING RELATED INFORMATION IN DIFFERENT FUNCTION MODES

[75] Inventor: Shinji Hidaka, Oome, Japan

[73] Assignee: Casio Computer Co., Ltd., Tokyo, Japan

[21] Appl. No.: 407,403

[22] Filed: Mar. 17, 1995

Related U.S. Application Data

[63] Continuation of Ser. No. 94,607, Jul. 19, 1993, abandoned.

[30] Foreign Application Priority Data

Jul. 20, 1992 [JP] Japan .................................. 4-215541

[51] Int. Cl.⁶ .................................................... G06F 15/30
[52] U.S. Cl. .......................... 395/800; 395/834; 395/792; 395/352; 395/761; 364/254.8; 364/256.8; 364/260; 364/958.3; 364/943.41; 364/975; 364/943; 364/DIG. 1
[58] Field of Search ...................................... 395/800, 200, 395/145, 148, 156, 834; 364/419.07, 419.11, 419.19, DIG. 1, 254.8, 256.8, 260, 958.5, 943.41, 975

[56] References Cited

U.S. PATENT DOCUMENTS

| | | | |
|---|---|---|---|
| Re. 34,476 | 12/1993 | Norwood | 382/13 |
| 4,459,036 | 7/1984 | Sado et al. | 368/251 |
| 5,043,721 | 8/1991 | May | 340/825.44 |
| 5,084,833 | 1/1992 | Matsuda et al. | 364/709.04 |
| 5,128,981 | 7/1992 | Tsukamoto et al. | 379/58 |
| 5,220,540 | 6/1993 | Nishida et al. | 368/41 |
| 5,221,838 | 6/1993 | Gutman et al. | 235/379 |

FOREIGN PATENT DOCUMENTS

| | | |
|---|---|---|
| 0519838A1 | 12/1992 | France . |
| 62-27853 | 2/1987 | Japan . |
| 64-8492 | 1/1989 | Japan . |
| WO90/13213 | 11/1990 | WIPO . |

OTHER PUBLICATIONS

BYTE, vol. 17, No. 3, Mar. 1992, St. Petersborough US, pp. 92IS-7-92IS-16, Pountain 'Psion Series 3: The Whole Story'.

Primary Examiner—Alyssa H. Bowler
Assistant Examiner—Dzung C. Nguyen
Attorney, Agent, or Firm—Frishauf, Holtz, Goodman, Langer & Chick

[57] ABSTRACT

A plurality of memory areas which store various type of information having different formats such as address information, schedule information, memo information in units of type of information are provided. Information stored in one of memory areas can be displayed on the display section by operating one of mode designate keys each of which corresponds to each information to select a function mode. Information stored in another of memory areas can be registered and/or retrieved by using a data item such as a person's name consisting of part of the designated information by operating a menu key and menu selection key, i.e., ten key during when the designated information is being displayed in a designated function mode.

80 Claims, 28 Drawing Sheets

FIG.3

| COMPANY NAME | PERSON'S NAME | TELEPHONE NO. | ADDRESS | OTHERS |
|---|---|---|---|---|
| | | | | |
| | | | | |
| | | | | |

ADDRESS DATA STORAGE AREA 29a

| SCHEDULE TIME INFORMATION | CONTENTS OF SCHEDULE | APPOINTMENT DESTINATION | SENDER'S NAME | OTHERS |
|---|---|---|---|---|
| | | | | |
| | | | | |
| | | | | |

SCHEDULE DATA STORAGE AREA 29b

| RECEPTION TIME | CONTENTS OF MEMO | SENDER'S NAME |
|---|---|---|
| | | |
| | | |
| | | |

MEMO DATA STORAGE AREA 29c

| RECEPTION TIME | RECEIVED DATA |
|---|---|
| | |
| | |
| | |

NORMAL MASSAGE DATA STORAGE AREA 29d

| |
|---|
| |
| |
| |

ORIGINAL DATA STORAGE AREA 29e

29

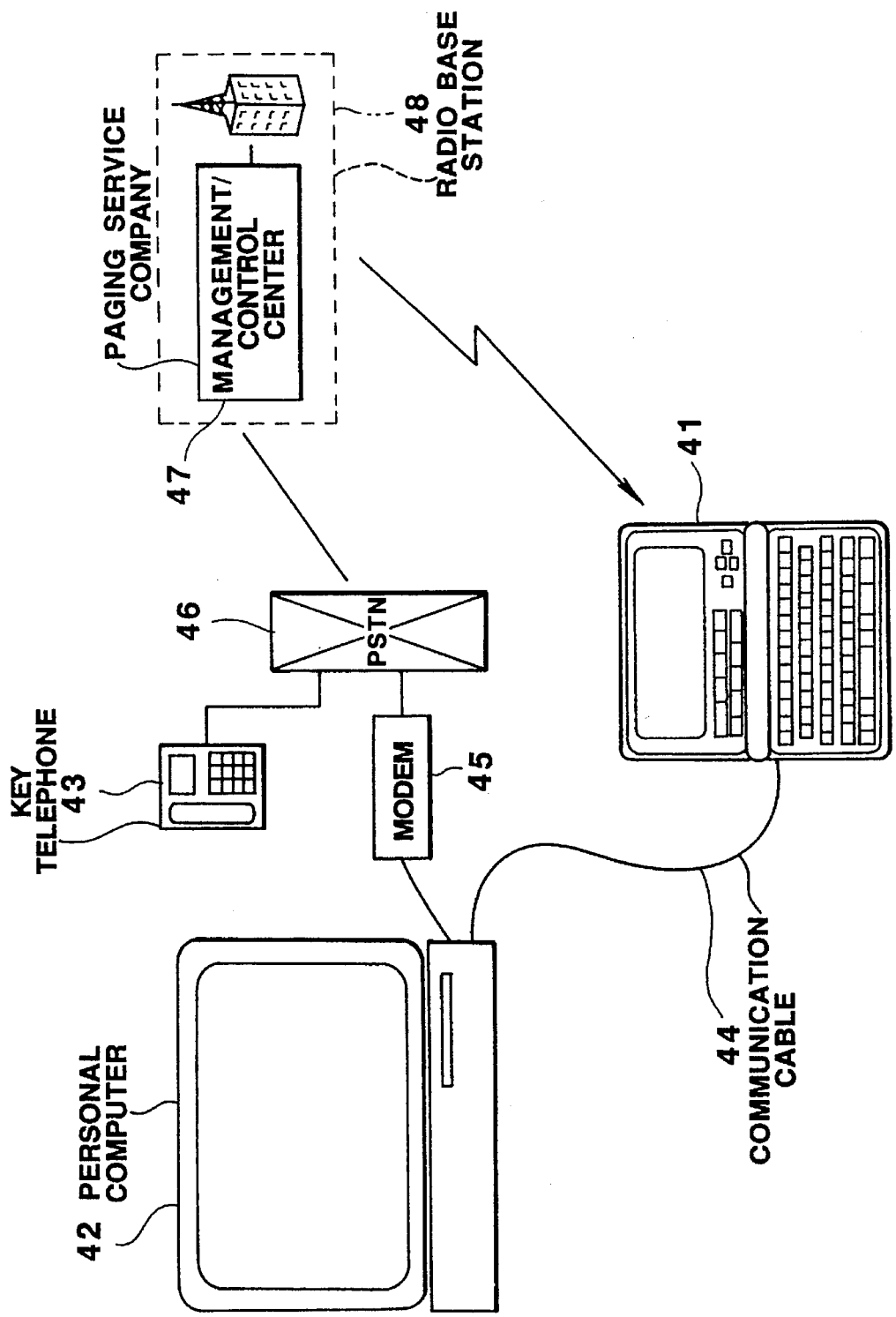

FIG.5
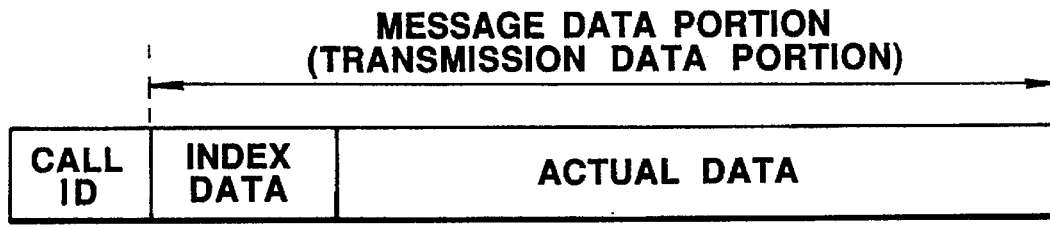
FIG.6
|   | A | B | C | D | E |
|---|---|---|---|---|---|
| 1 | DA1 | DB1 | DC1 | DD1 | DE1 |
| 2 | DA2 | DB2 | DC2 | DD2 | DE2 |
| 3 | DA3 | DB3 | DC3 | DD3 | DE3 |
| 4 | DA4 | DB4 | DC4 | DD4 | DE4 |
FIG.7
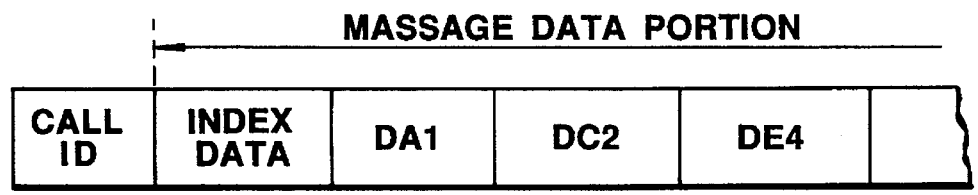

FIG.10

| ADDRESS | | |
|---|---|---|
| 1 | A COMPANY | TATEKI OISHI |
| 2 | A COMPANY | OKUICHI KAKU |
| 3 | A COMPANY | SHINJI HIDAKA |

FIG.11

```
ADDRESS
A COMPANY
SHINJI HIDAKA
    TEL:03-334-0009
        MANAGEMENT DEPARTMENT
```

FIG.12

| MENU | |
|---|---|
| 1 | ADDRESS CORRECTION |
| 2 | ADDRESS REGISTRATION |
| 3 | SCHEDULE RETRIEVAL |

FIG.13

| COMPANY NAME |
|---|
| PERSON'S NAME |
| TEL NO. |
| ADDRESS |
| OTHER |

FIG.15

| SCHEDULE | | | HIDAKA |
|---|---|---|---|
| 1 | 6/17 | 13:00~15:00 | MEETING A COMPANY |
| 2 | 6/18 | 18:00~21:00 | * * * * * * |
| | | | |

MEETING

RECEPTION ROOM A    THREE PERSONS

A COMPANY    HIDAKA

TEL:03-334-0009

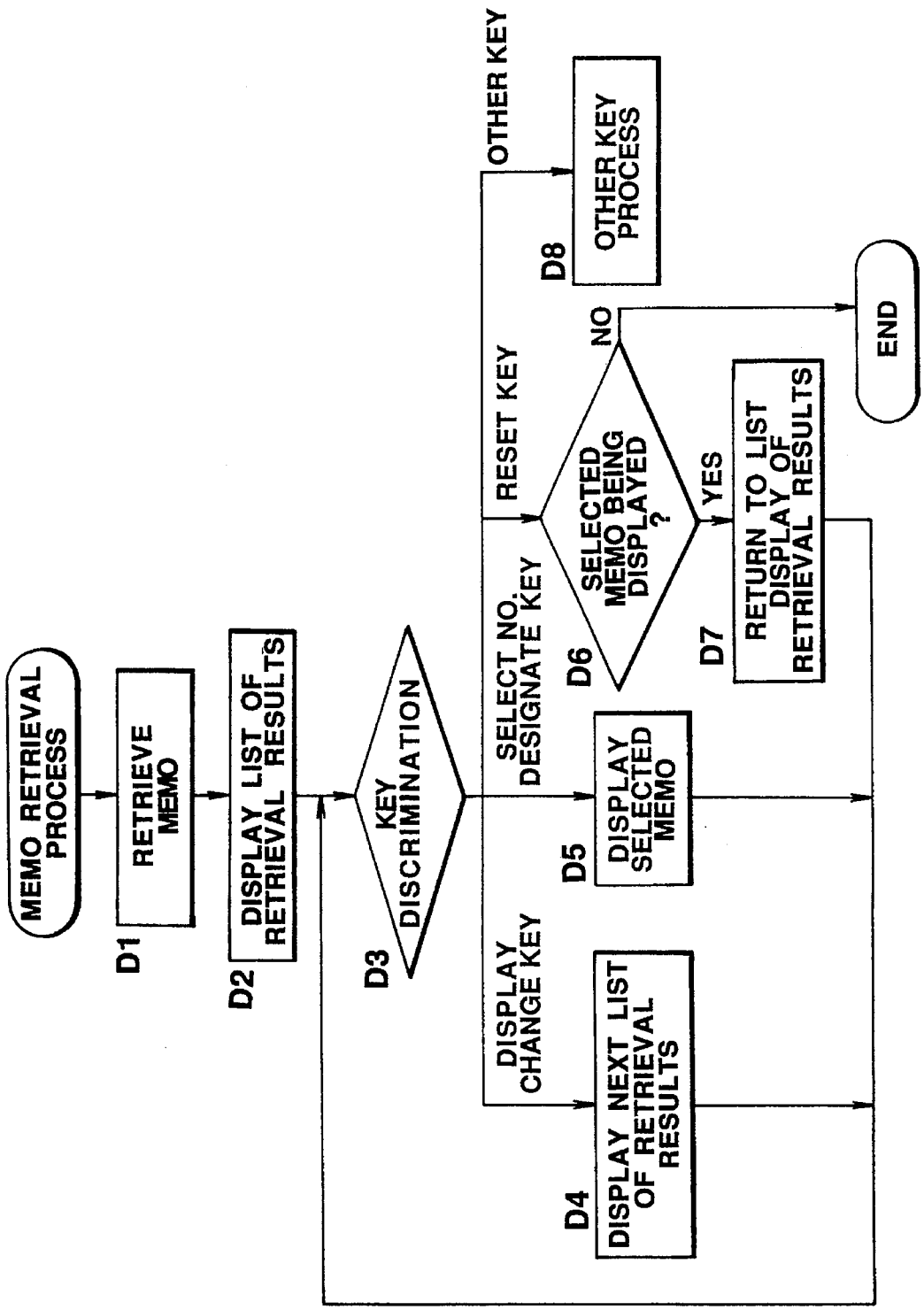

FIG.18

| MEMO | | | HIDAKA |
|---|---|---|---|
| 1 | 6/17 | 13:00 | TOMORROW'S PARTY |
| 2 | 6/18 | 15:00 | MEET 6:00 TODAY |
|   |      |       |                  |

FIG.19

TOMORROW'S PARTY WILL
START AT 6:00

HIDAKA    TEL:03-334-0009

6/17   13:00

FIG.26

| ADDRESS | | A COMPANY |
|---|---|---|
| 1 | TATEKI OISHI | 0425-79-7345 |
| 2 | OKUICHI KAKU | 0425-79-7319 |
| 3 | SHINJI HIDAKA | 03-334-0009 |

FIG.27

| ADDRESS | | HIDAKA |
|---|---|---|
| 1 | SHINJI HIDAKA | 03-334-0009 |
| | | |
| | | |

FIG.39

| MODEL | STOCK | DISTRIBUTION OF THIS MONTH | OFFER | ALLOCATION | BALANCE |
|---|---|---|---|---|---|
| ATN112 | 00 | 500 | 322 | 241 | 269 |
| ATN301 | 296 | 380 | 190 | 145 | 244 |
| SAB212 | 239 | 380 | 190 | 145 | 244 |
| HS30W | 239 | 1100 | 457 | 341 | 842 |
| HS20 | 421 | 1100 | 457 | 341 | 842 |

INFORMATION MANAGING APPARATUS CAPABLE OF UTILIZING RELATED INFORMATION IN DIFFERENT FUNCTION MODES

This application is a continuation, of application Ser. No. 08/094,607, filed Jul. 19, 1993 now abandoned.

BACKGROUND OF THE INVENTION

1. Field of the Invention

The present invention relates to an information managing apparatus for managing various types of information placed in different categories in accordance with their categories and, more particularly, to an information managing apparatus which can store and display various types of information input by operating keys and the like in units of types of information.

2. Description of the Related Art

Various information managing apparatuses are known, among which are electronic notebook and portable computers. An electronic notebook is used widely as a personal apparatus for managing various information, for example. The electronic notebook has address note (telephone directory) function for registering and retrieving address information, schedule function for registering and retrieving schedule information, calendar function for registering and retrieving calendar information, and memo function for registering and retrieving memo information, and also function as a calculator. The electronic notebook has a keyboard comprising many keys, some of which are assigned to the address (telephone number) registering and retrieving function, schedule registering and retrieving function, the calendar registering and retrieving function, memo registering and retrieving function, the calculator function, and the like. To register or retrieve an information item of any type into and from the memory, a user operates the key assigned to the corresponding function, thereby selecting that function, and then operates some other keys.

Some types of electronic notebook and portable computers can be connected by a communication cable to an office computer or a home-use computer such as a personal computer, so that they may access the information stored in a large-capacity memory incorporated in the office computer or home-use computer. Other types can be connected to a paging receiver, so that information radio-transmitted from an information source may be input to them through the paging receiver. U.S. Pat. No. 5,043,721, for example, discloses a portable computer with a plug-in type accessory port and a portable computer with a communication interface port such as an RS232 port. The conventional information managing apparatuses described above can store and display addresses, schedules, memos, and the like.

However, in the conventional information managing apparatuses, any type of data cannot be registered or displayed unless the corresponding function is being selected. More specifically, addresses can be neither registered nor retrieved unless the address registering and retrieving function is selected. Schedule data can be neither registered nor retrieved unless the schedule registering and retrieving function is selected. Memo information can be neither registered nor retrieved unless the memo registering and retrieving function is selected. Therefore, to retrieve and check an information item related to another which is being retrieved, the user needs to change the function. This is rather cumbersome for the user to do.

Of course, such a related data or information item can be stored in not only the proper storage area of the memory, but also the same storage area as the data item being retrieved from the memory. Then, both data items may be simultaneously retrieved and displayed. In this case, however, the same data or information item is stored in a plurality of storage areas, inevitably reducing the memory-use efficiency.

A data or information item such as a person's name needs to be stored along with not only address information, but also schedule information and memos information. Hence, the data item must be stored in two or more storage areas of the memory. Here lies a problem. Since any data item cannot be registered unless the corresponding function is selected, the user must repeat almost the same input operation as many times as the independent storage areas into which the data item is stored. This is also troublesome work for the user.

SUMMARY OF THE INVENTION

Accordingly, the object of the present invention is to provide an information managing apparatus which can register and retrieve related information in plural and different function modes, and has storage areas assigned to various categories of data, and which can simultaneously register and retrieve an data item into and from different storage areas of the memory.

According to an aspect of the present invention, there is provided an information managing apparatus comprising: means for inputting various types of information, each consisting of a plurality of data items; a plurality of storing means, each having storage areas in which said plurality of data items of one type of information are stored and for independently storing said data items of one type of information which is input from said inputting means; first designating means for designating one of said storing means so as to display selectively information stored in the designated one of said storing means; means for displaying said information stored in that one of said storing means designated by said first designating means; second designating means for designating a mode in which information is to be registered into and retrieved from another of said storing means while said displaying means is displaying said information designated by said first designating means; and means for executing registration of a specified data item of information which is being displayed into said another of said storing means and retrieval of said specified data item of information from said another of said storing means in accordance with said mode designated by said second designated means.

According to another aspect of the present invention, there is provided an information managing apparatus comprising: means for inputting function mode information of serious formats used for a plurality of function modes, each function mode information consisting of a plurality of data items; a plurality of storing means, each being provided independently and correspondingly to one of said function modes and having storage areas in which said plurality of data items of information of one format are stored, and for storing information input from said inputting means; means for displaying selectively said function mode information of various formats; display mode selecting means for selecting one of said function modes to selectively display information stored in one of said storing means which corresponds to selected one function mode on said displaying means;

process mode selecting means for selecting another of said function modes to process information stored in another of said storing means which corresponds to selected another function mode; and means for enabling said display mode selecting means and said process mode selecting means to independently operate and for processing information of said another of said function modes while information of said one of said function modes is being displayed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 3 is a diagram showing a memory map of the RAM shown in FIG. 2;

FIG. 4 is a view showing a system arrangement in which information is input from an external device to the information managing apparatus of the present invention;

FIG. 5 is a diagram showing a data structure of a signal transmitted to the information managing apparatus from a radio base station of FIG. 4;

FIG. 6 is a diagram showing an example of an original data format;

FIG. 7 is a diagram showing a data structure of a signal transmitted from a radio base station when transmitted data is the original data;

FIG. 10 is a diagram showing an example of address list displayed in the address mode process of FIG. 9;

FIG. 11 is a diagram showing an example of address data displayed in the address mode process of FIG. 9;

FIG. 12 is a diagram illustrating an example of selection menu displayed in the address mode process of FIG. 9;

FIG. 13 is a diagram showing an example of a guidance display displayed in an address registration process used in the address mode process of FIG. 9;

FIG. 15 is a diagram showing an example of displayed results of schedule retrieval;

FIG. 16 is a diagram showing an example of displayed schedule data;

FIG. 17 is a flowchart for explaining a memo retrieval mode process performed in the address mode process of FIG. 9;

FIG. 18 is a diagram showing an example of displayed results of memo retrieval;

FIG. 19 is a diagram showing an example of displayed memo data;

FIG. 21 is a diagram illustrating an example of a today schedule displayed in the schedule mode process of FIG. 20;

FIG. 22 is a diagram showing an example of a weekly schedule displayed in the schedule mode process of FIG. 20;

FIG. 26 is a diagram showing an example of displayed results of an address retrieval of FIG. 25;

FIG. 27 is a diagram showing another example of displayed results of address retrieval of FIG. 25;

FIG. 39 is a view showing an example of file data displayed in the original data mode process of FIG. 38.

DETAILED DESCRIPTION OF THE PREFERRED EMBODIMENT

An embodiment of the present invention will now be described referring to the accompanying drawings.

Structure of Information Managing Apparatus

Figure 1:
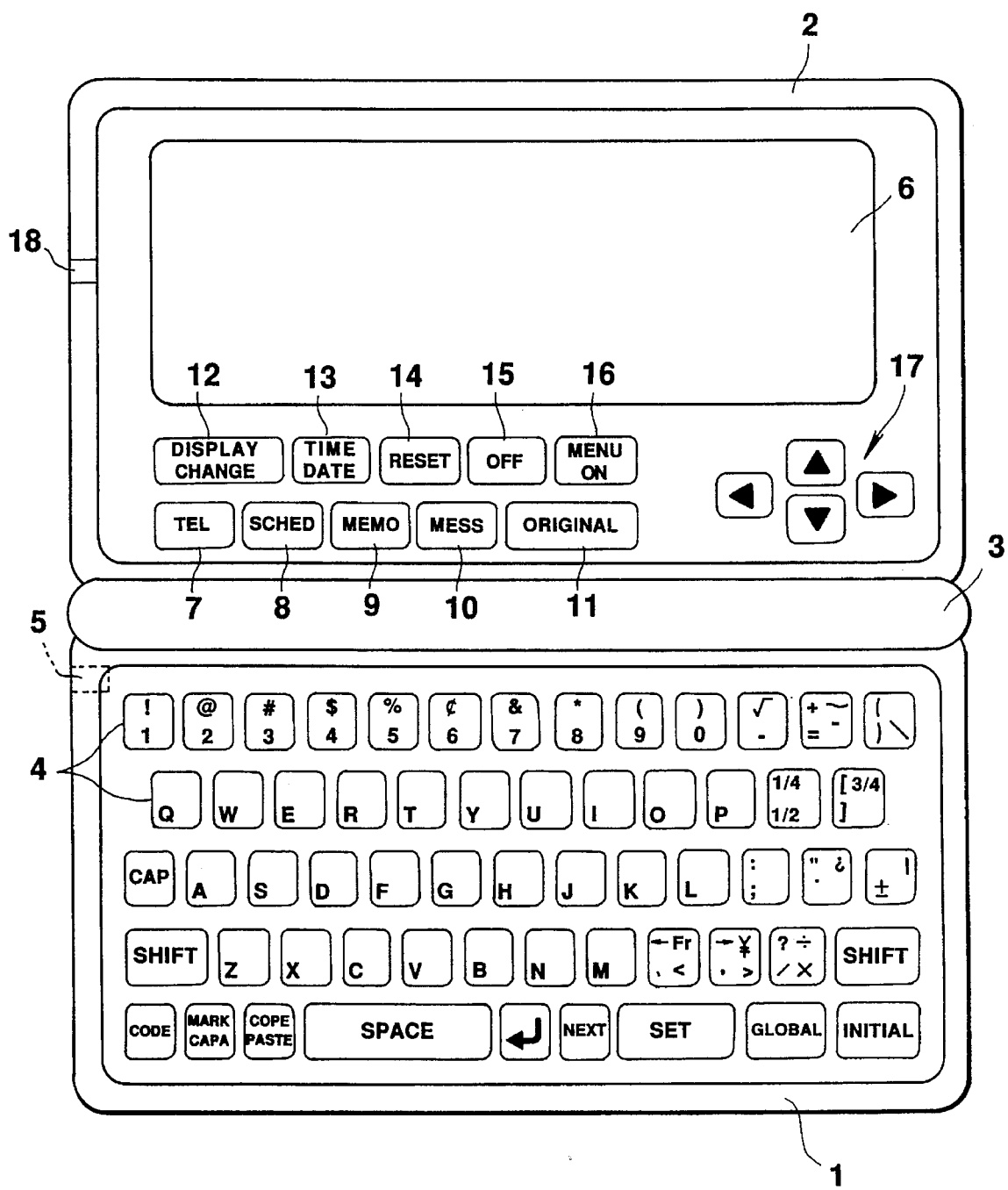
FIG. 1 is a view illustrating an external appearance of an information managing apparatus according to the present invention.

FIG. 1 is a view illustrating the external appearance of the information managing apparatus according to the present invention. The information managing apparatus according to the present invention is designed to allow various types of information to be input by an external devices via a communication cable or radio communication as well as data input keys provided on this apparatus. This apparatus is also provided with means for storing various types of input information, such as address information, schedule information and memo information, independently for each information type, and means for displaying them. In FIG. 1, reference numeral 1 denotes a main body of the apparatus; 2, a cover of the main body; and 3, a hinge portion which rotatably supports the cover 2 on the main body 1. In other words, the information managing apparatus of this embodiment is designed so that the main body 1 and the cover 2 are foldable with respect to each other at the hinge portion 3. A plurality of data input keys 4, which include alphabetic keys, numeric keys and control keys, are provided on the top of the main body 1. A connector 5 for a communication cable is provided at one side of the main body 1. Although not shown, an antenna for receiving radio signals, essential electronic parts constituting an electronic circuit to be described later, a battery and so forth are incorporated in the main body 1. Provided at the front of the cover 2 are a display 6, a telephone key 7, a schedule key 8, a memo key 9, a message key 10, an original key 11, a display change key 12, time/date key 13, a reset key 14, an off key 15, a menu (MENU/ON) key 16, and cursor moving keys 17. An LED cover 18 is provided at one side edge portion of the cover 2. The display 6 displays various types of information consisting of characters, numerals, symbols and so forth, and is constituted of, for example, a dot matrix type of liquid crystal display unit. The telephone key 7 designates an address mode in which address data consisting of a person's name, a telephone number, etc. can be registered and retrieved. The schedule key 8 designates a schedule mode in which schedule data can be registered and retrieved. The memo key 9 designates a memo mode in which memo data can be registered and retrieved. The message key 10 designates a normal message mode in which message data can be retrieved. The original key 11 designates an original data mode in which original data can be registered and retrieved. A display change key 12 serves to change display data while a process in each mode is being executed. The time/date key 13 designates a mode to display the current date and time. The reset key 14 stops reception indication or resets a sub mode in such a mode as the address mode. The off key 15 instructs the deactivation of the display function. The menu/ on key 16 instructs the activation of the display function or instructs menu display while the display function is enabled. The cursor move keys 17 instruct the moving direction of the cursor displayed on the display 6 or instruct a screen scroll. The LED cover 18 serves to extract light of a reception indicating LED (light Emitting Diode) from the front, side and back of the cover 2.

Figure 2:
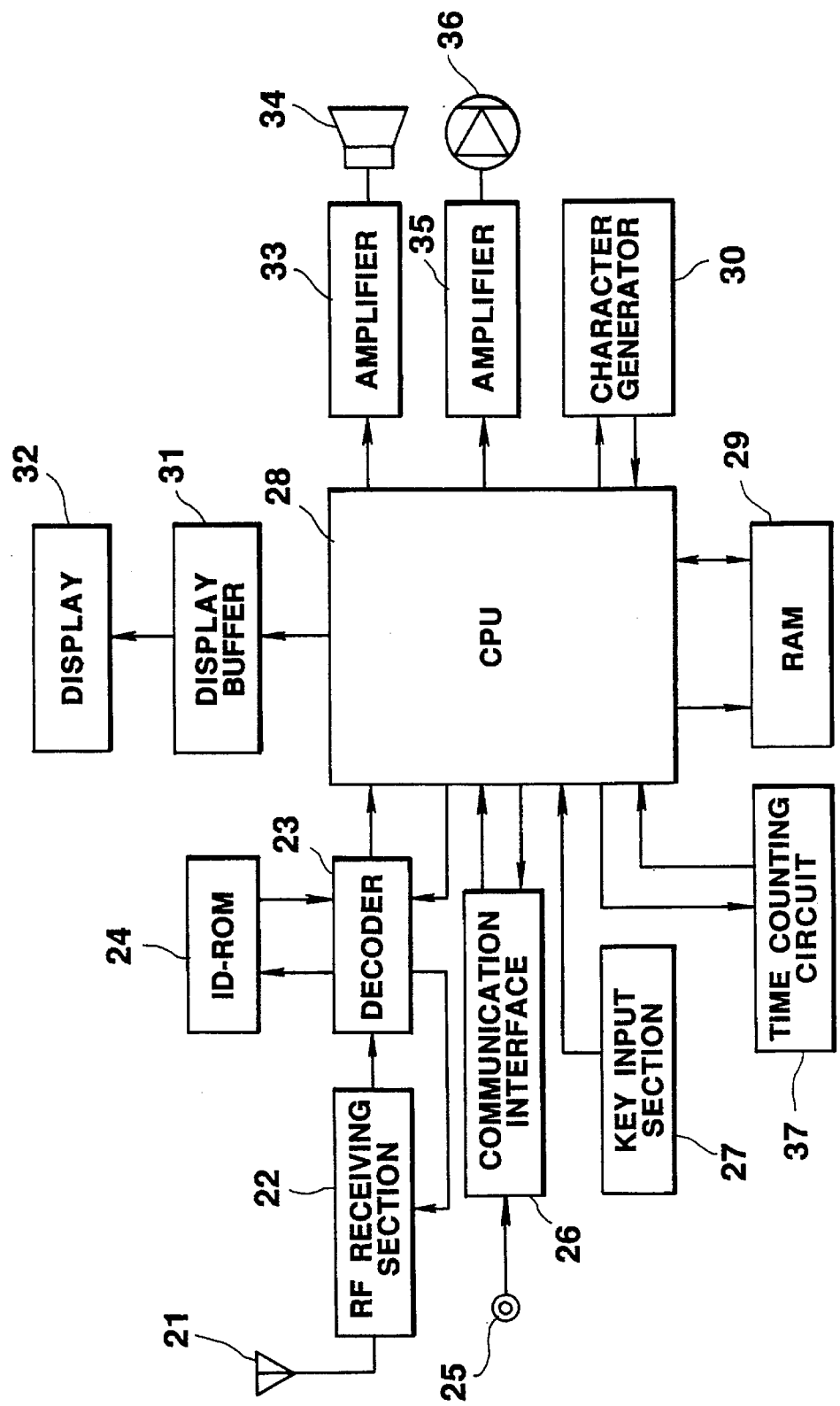
FIG. 2 is a block diagram illustrating the circuit structure of the information managing apparatus shown in FIG. 1.

FIG. 2 is a block diagram illustrating the circuit structure of the information managing apparatus shown in FIG. 1. The information managing apparatus of the present invention has, as information input means, paging signal reception means which includes an antenna 21, a radio frequency receiving section 22, a decoder 23 and an ID-ROM (Identification Read Only Memory) 24; communication means which includes a connector 25 and a communication interface 26; and a key input section 27 having a plurality of keys shown in FIG. 1. In addition, a RAM (Random Access Memory) 29 for storing information from those components, a character generator (CG) 30 having stored a plurality of character patterns, a display buffer 31 for temporarily storing a plurality of character patterns corresponding to information to be displayed on a display section 32, an amplifier 33 for driving a loudspeaker 34 for informing reception, an amplifier 35 for driving an LED 36 for informing reception, and a time counting circuit 37 for counting the current time are provided. The decoder 23, the communication interface 26, the key input section 27, the RAM 29, the CG 30, the display buffer 31, the amplifiers 33 and 35, and the time counting circuit 37 are connected to the CPU (Central Processing Unit) 28. The antenna 21 receives a call signal radio-transmitted from a radio base station such as a paging service company, and outputs the call signal to the radio receiver section 22. The radio frequency receiving section 22 intermittently receives the call signal input from the antenna 21, demodulates the received signal and supplies the demodulated signal to the decoder 23 under the control of the decoder 23. The decoder 23 determines if the call number specified by the input call signal from the radio frequency receiving section 22 matches with its own identification number registered in advance in the ID-ROM 24. If matching occurs, the decoder 23 permits the radio frequency receiving section 22 to continue the signal reception, and sends out a call detection signal to a CPU 28. The decoder 23 also outputs information, received following the call signal due to the resumed signal reception, to the CPU 28 in response to a request from the CPU 28. The connector 25 is the connector 5 for a communication cable, and is connected to an external device via the communication cable. This connector 25 is also connected via the communication interface 26 to the CPU 28. The communication interface 26 outputs the information, input via the communication cable and connector 25 from an external device, to the CPU 28, and outputs the information from the CPU 28 to the external device via the communication cable and connector 25. When any of the keys shown in FIG. 1 is operated, the key input section 27 outputs a key signal corresponding to the operated key to the CPU 28.

FIG. 3 is a diagram showing a memory map of the RAM 29 of FIG. 2. The RAM 29 has an address data storage area 29a, a schedule data storage area 29b, a memo data storage area 29c, a normal message data storage area 29d, and an original data storage area 29e, so that it can store information input from the decoder 23, etc. for each information type, as shown in FIG. 3. The individual data storage areas are divided as follows. The address data storage area 29a is divided into areas for storing company name, person's name, telephone number, address or belonging department, and other arbitrary data. The schedule data storage area 29b is also divided into areas for storing schedule time information, contents of the schedule, appointment destination, sender's (transmitter's) name, and other arbitrary data. The memo data storage area 29c is also divided into areas for storing reception time, contents of a memo, and sender's name. The normal message data storage area 29d is also divided into areas for storing reception time, and received data. The original data storage area 29e is not divided into fixed areas, but can be divided into arbitrary areas by a user in accordance with data to be stored. The display section 32 is the display 6 constituted of a dot matrix type liquid crystal display unit or the like. The CPU 28 incorporates a ROM where various control programs are stored, a timer, input registers, etc. Based on the control programs stored in the ROM, the CPU 28 controls the individual circuit sections and execute various processes, such as a reception process, address mode process, and a schedule mode process, which will be described later. Beside the control programs, character data which are to be displayed on a menu display to be described later are also stored in the ROM.

Operation of the Apparatus

A description will now be given of the operation of the information managing apparatus of the present invention. As described earlier, the information managing apparatus of this embodiment has the connector for a communication cable and the antenna for receiving radio-transmitted signals as well as a plurality of data entry keys as information input means, so that this apparatus can receive information from an external device via the communication cable or a radio communication system, e.g., radio paging system.

FIG. 4 is a view showing a system arrangement in the case where information is input from an external device via the communication cable and radio paging system to the information managing apparatus of the present invention. In FIG. 4, reference numeral 41 denotes the information managing apparatus of the present invention; 42, a personal computer which can be used as an external device for inputting information; and 43, a key telephone which also can be used as an external device for inputting information. Since the information managing apparatus 41 has the connector 5 (25) for a communication cable, the apparatus 41 can be connected via a communication cable 44 to the personal computer 42. Accordingly, various types of data prepared and stored in the personal computer 42, such as address data, schedule data and document data, can be stored directly in the RAM 29 of the information managing apparatus 41. The personal computer 42, when connected via a modem 45 to a PSTN (Public Switched Telephone Network) 46, can input information to the RAM 29 of the information managing apparatus 41 via a radio base station 48 of a paging service company. More specifically, when a call number assigned to the information managing apparatus 41 and information to be transmitted are transmitted via the PSTN 46 to a management control center 47 in the paging service company, the radio base station 48 transmits out an ID (Identification) code assigned to the information managing apparatus 41 and transmitted information, which will be received by the information managing apparatus 41. In the case of the key telephone 43, likewise, when the call number assigned to the information managing apparatus 41 and information to be transmitted are sent via the PSTN 46 to the management control center 47, this information can be input to the information managing apparatus 41.

FIG. 5 is a diagram showing a data structure of a transmission signal to be transmitted from the radio base station 48 of FIG. 4. The transmission signal has the ID code of a paging receiver to be called, followed by a message data portion, i.e., transmission data portion to be transmitted to the paging receiver. The message data portion is the data which a sender has sent to the management control center 47 in the paging service company. When data to be transmitted is address data, schedule data or memo data, the sender adds index data indicating the type of information, before the actual data to be transmitted, and transmits the actual data with an item name or item separator inserted for each item data so that data for each item, described earlier with reference to FIG. 3, can be properly recognized by the receiver.

FIG. 6 is a diagram showing an example of an original data format. The information managing apparatus 41 can use a combination of information input via the communication cable and information input via the radio paging system. For instance, when data to be registered in the information managing apparatus 41 is a document type data as shown in FIG. 6, document format data, or document format data and each item data may be transmitted in advance via the communication cable to the information managing apparatus 41 from the personal computer 42 to be registered in this apparatus 41. As a result, only newly registered data or altered data can be transmitted via the radio paging system to the apparatus 41.

FIG. 7 is a diagram showing a data structure of a transmission signal in the case where only altered data portions in the table in FIG. 6 are transmitted. In this case, the index data portion in the message data portion following the call ID includes a code which indicates that the information to be sent is original data. The actual data portion in the message data portion contains only the altered data (DA1, DC2, DE4) in the table together with data which indicates the altered sections.

Reception Process

Figure 8:
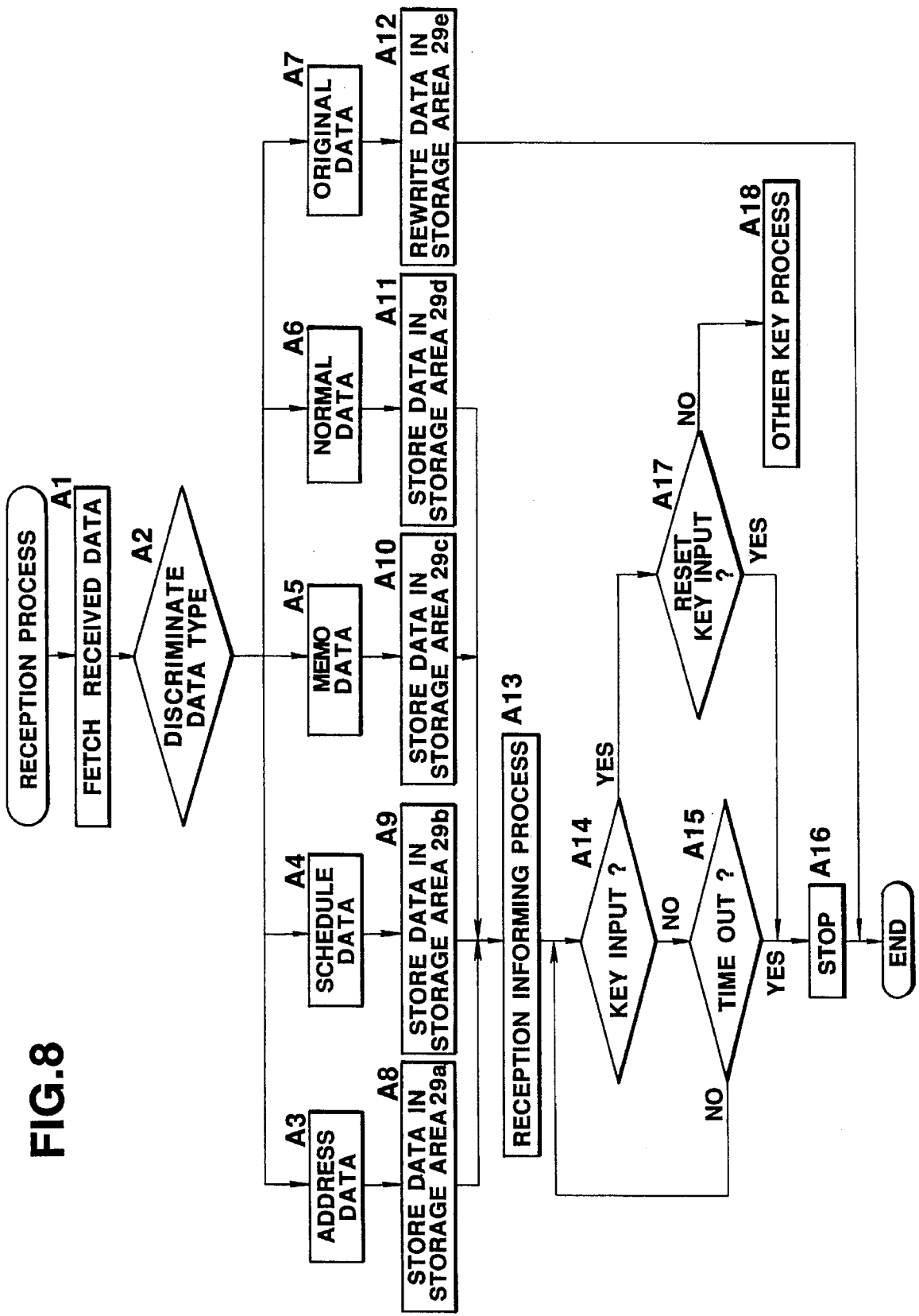
FIG. 8 is a flowchart for explaining a reception process performed in the apparatus in response to a call signal transmitted from the radio base station.

FIG. 8 is a flowchart for explaining a reception process performed in the apparatus 41. The reception process which will be performed when this apparatus 41 receives a call signal destined to own apparatus 41 from the radio base station 48 of the paging service company will be described below referring to the flowchart shown in FIG. 8. When the decoder 23 of FIG. 2 detects that the call signal received by the antenna 21 and demodulated by the radio frequency receiving section 22 is destined to own apparatus 41, the decoder 23 outputs a call detection signal to the CPU 28. Upon reception of the call detection signal, the CPU 28 starts the reception process. Data which has been received and decoded by the decoder 23 is fetched by the CPU 28 (step A1), and then the type of the received data is discriminated (step A2). In other words, the data type is determined as one of address data, schedule data, memo data, normal message data and original data, based on the index data following the call ID in the transmitted data shown in FIG. 5. If the determined type of the data is address data (step A3), data of individual items are stored in the address data storage area 29a in the RAM 29 in FIG. 3 (step A8). If the determined data type is schedule data (step A4), data of individual items are likewise stored in the schedule data storage area 29b in the RAM 29 (step A9). If the data type is memo data (step A5), the received data of the individual items and the reception time, i.e., the current time counted by the time counting circuit 37 are stored in the memo data storage area 29c in the RAM 29 (step A10). If the data type is normal data with a nonfixed type data format or data that has no filed data added (step A6), the received data and the reception time are stored in the normal message data storage area 29d in the RAM 29 (step A11). If the data type is original data (step A7), the original data in the original data storage area 29e in the RAM 29 is rewritten in accordance with the instruction of that original data before terminating this process (step A12).

After completing data storage in any of steps A8 to A11 in FIG. 8, a reception informing process will be started (step A13). More specifically, the reception informing process consists of processes of reading the character pattern of each of characters constituting the received data from the CG 30 of FIG. 2; setting the character patterns in the display buffer 31 to thereby display the received data on the display section 32 (the liquid crystal display 6 in FIG. 1); outputting an informing signal via the amplifier 33 to the loudspeaker 34 to be sounded; and/or outputting a lighting signal via the amplifier 35 to the LED 36 to light it. Then, it is determined if a key input from any of the various keys of FIG. 1 has been entered within a predetermined period of time (steps A14 and A15). If no key input has been entered, the reception informing process such as data display is stopped before terminating this process (step A16). On the other hand, if a key input has been entered, it is then determined if that key input is an input by the reset key 14 (step A17). If it is the reset key 14 operated, the reception informing process such as data display will be stopped immediately before terminating this process (step A16). If the key input is not the reset key input in the step 17, a process according to other key input will be initiated (step A18). As the information managing apparatus of the present invention has the telephone key 7, schedule key 8, memo key 9, message key 10 and original key 11 as mode designating keys, as shown in FIG. 1, it is possible to select a processing mode by operating any of those mode keys. As a result, various types of processes, such as registering and retrieving for the received data (management information) stored in the RAM 29 is specified. The operations in the individual modes will be described below.

Address Mode Process

The address mode process will be described referring to the flowchart given in FIG. 9. When the telephone key 7 of FIG. 1 is depressed, a telephone key input signal is input to the CPU 28 from the key input section 27 and the address mode process will be initiated. First, main item data (company name and person's name) in address data is read out from the address data storage area 29a in the RAM 29. A list of addresses shown in FIG. 10 is displayed on the display section 32 (step B1). It is then discriminated whether the subsequent input key is an input by the display change key 12, the select number designate key (numeric key) or some other key (step B2). If the key input is that of some other key, a process designated by that input key will be initiated (step B3). If the key input is an input by the display change key 12, the next list of addresses will be displayed (step B4). The process then returns to the input key discrimination in step B2. If the input key is a select number designate key, i.e., a numeric key corresponding to the selection number displayed on the left end of the address list display on the screen of FIG. 10, the address data of the selected number will be displayed on the display section 32, as shown in FIG. 11 (step B5). FIG. 11 shows an example of display when the address data of the select number designate key "3" is selected. Then, it is determined whether or not the menu key 16 is depressed (step B6). If a key other than the menu key 16 is depressed, a process designated by that key input will be initiated (step B3). On the other hand, when the menu key 16 is depressed, a menu will be displayed on the display section 32, as shown in FIG. 12, to request a menu selection (step B7). The menu selection in step B8 is executed by designating the desired selection number displayed on the left end on the menu display screen in FIG. 12, as done in the selection of the address data. There are a plurality of menus, i.e., address connection mode, address registration mode, schedule retrieval mode, memo retrieval mode and erase mode which can be selected by the user in the step B7. When they cannot be displayed on a single screen, the menu display is changed to the next menu display by operating the display change key 12.

Figure 9:
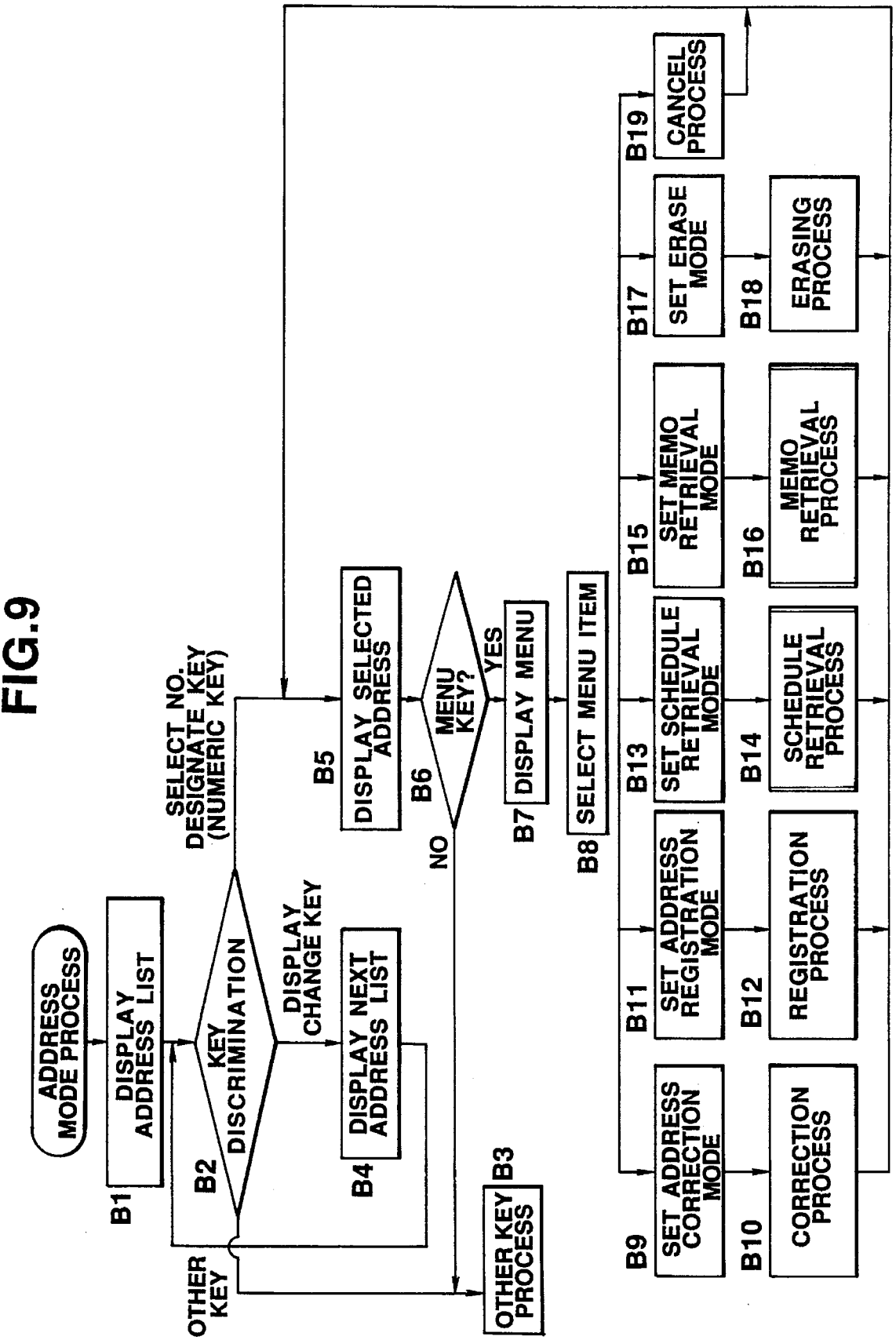
FIG. 9 is a flowchart for explaining an address mode process.

If the address correction mode is selected in the menu selection step in step B8 of FIG. 9, this address correction mode is set (step B9) to permit correction of the address data selected in step B5. When rewriting of the address data stored in the RAM 29 by the data entry keys 4 is completed, the process returns to the display of the selected address in step B5 (step B10). If the address registration mode is set in the menu selection in step B8 (step B11), a menu for individual items of FIG. 13 used for address registration process will be displayed on the display section 32 to request the registration of the address data. The address data are company name, person's name, telephone number, address and other data. The address data input by the operation of the data entry keys 4 is stored in an empty area in the address data storage area 29a in the RAM 29. The process then returns to the display of the selected address in step B5 (step B12). If the schedule retrieval mode is set in the menu selection in step B8 (step B13), a process for the schedule retrieval mode which will be described in detail later is executed. Thereafter the process returns to the display of the selected address in step B5 (step B14). If the memo retrieval mode is set in the menu selection in step B8 (step B15), a process for the memo retrieval mode which will be described in detail later is executed. The process then returns to the display of the selected address in step B5 (step B16). If the erase mode is set by the menu selection in step B8 (step B17), erasure of the address data of the selected number in the address data storage area 29a in the RAM 29 is executed before the process returns to the display of the selected address in step B5 (step B18). If the cancel process is specified in the menu selection in step B8 (step B18), the menu display is cancelled. The process returns to the display of the selected address in step B5 (step B19).

Figure 14:
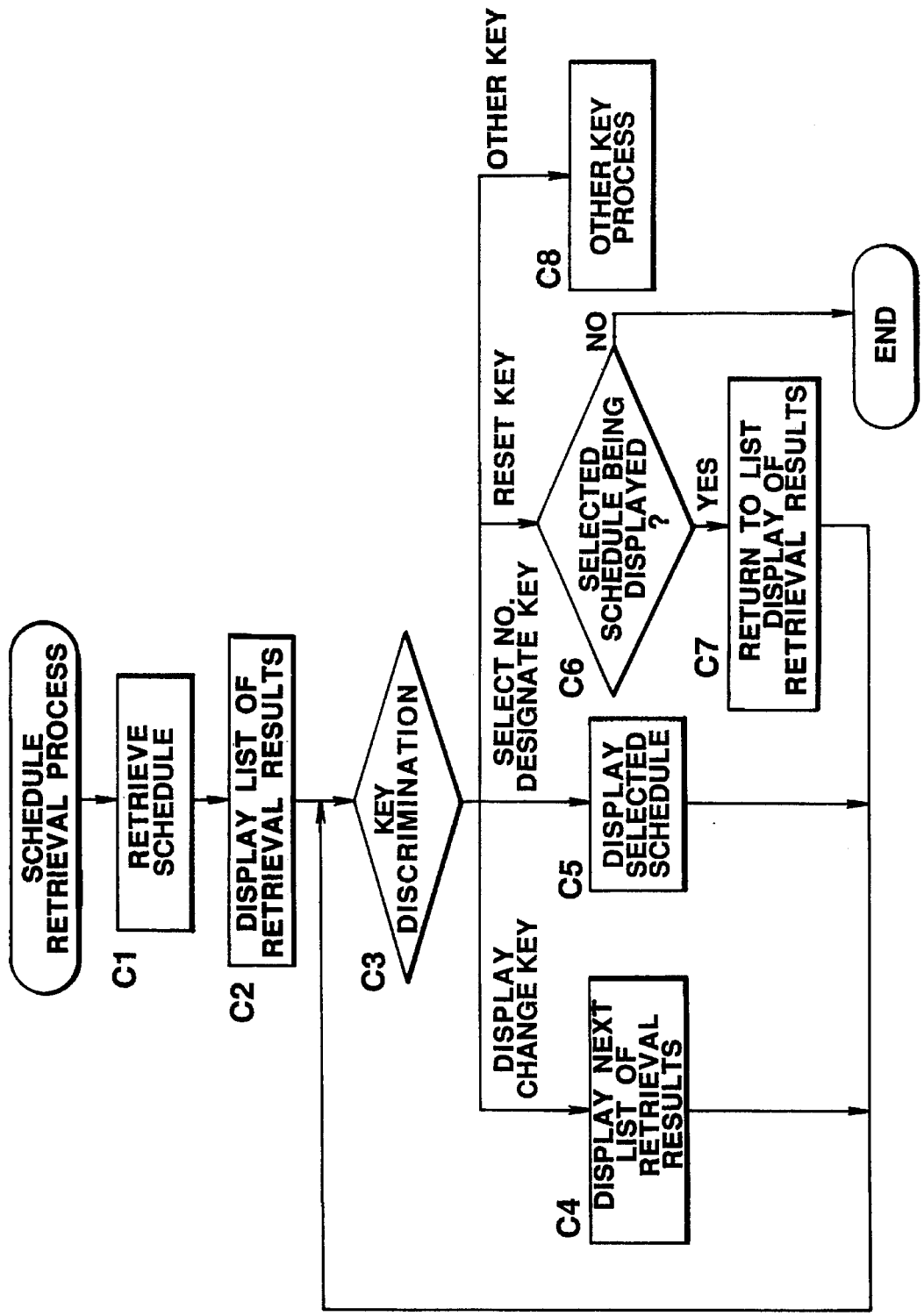
FIG. 14 is a flowchart for explaining schedule retrieval mode process performed in the address mode process of FIG. 9.

Referring to FIG. 14, the process for the schedule retrieval mode in step B14 in the address mode process of FIG. 9 will now be described. First, a schedule in which the appointment destination (appointed person's name) in the schedule data stored in the schedule data storage area 29b in the RAM 29 in FIG. 3 coincides with a person's name in the currently selected address data, i.e., the address data selected in step B5 in the address mode process in FIG. 9 is retrieved (step C1). A list of the retrieval results will be displayed on the display section 32 as shown in FIG. 15 (step C2). It is then discriminated whether the input key is the display change key 12, the select number designate key (numeric key), or the reset key 14 (step C3). If it is the display change key 12, the next list of the retrieval results will be displayed (step C4). The process then returns to the input key discrimination in step C3. If the select number designate key is used as the input key, a schedule for that selected number as shown in FIG. 16 will be displayed on the display section 32 (step C5). The process then returns to the input key discrimination in step C3. If the input key is the reset key 14, it is then determined whether or not the selected schedule is being displayed on the screen (step C6). Unless this schedule is being displayed on the screen, the process will be terminated without returning to step B5 in the address mode process of in FIG. 9. If this schedule is being displayed, the process returns to the display of a list of the retrieval results (step C7). The process then returns to the input key discrimination in step C3. If some other key is used as the input key, a process designated by that key input will be initiated (step C8).

Referring to FIG. 17, the process for the memo retrieval mode in step B16 in the address mode process of FIG. 9 will be described. First, a memo in which the sender's name in the memo data stored in the memo data storage area 29c in the RAM 29 matches with a person's name in the currently selected address data, i.e., the address data selected in step B5 in the address mode process in FIG. 9 is retrieved (step D1). A list of retrieval results as shown in FIG. 18 will be displayed on the display section 32 (step D2). It is then discriminated whether the input key is the display change key 12, the select number designate key (numeric key), or the reset key 14 (step D3). If the display change key 12 is used as the input key, the next list of retrieval results will be displayed (step D4) before the process returns to the input key discrimination in step D3. If the input key is the select number designate key, a schedule for that selected number, as shown in FIG. 19, will be displayed on the display section 32 (step D5). The process then returns to the input key discrimination in step D3. If the input key is the reset key 14, it is then determined whether or not the selected schedule is being displayed on the screen (step D6). Unless this schedule is displayed, this process will be terminated without returning to step B5 in the address mode process of FIG. 9. If the schedule is being displayed on the screen, the process returns to the display of a list of the retrieval results (step D7) and then returns to the input key discrimination in step D3. If some other key is used as the input key, a process designated by that input key will be initiated (step D8).

Schedule Mode Process

Figure 20:
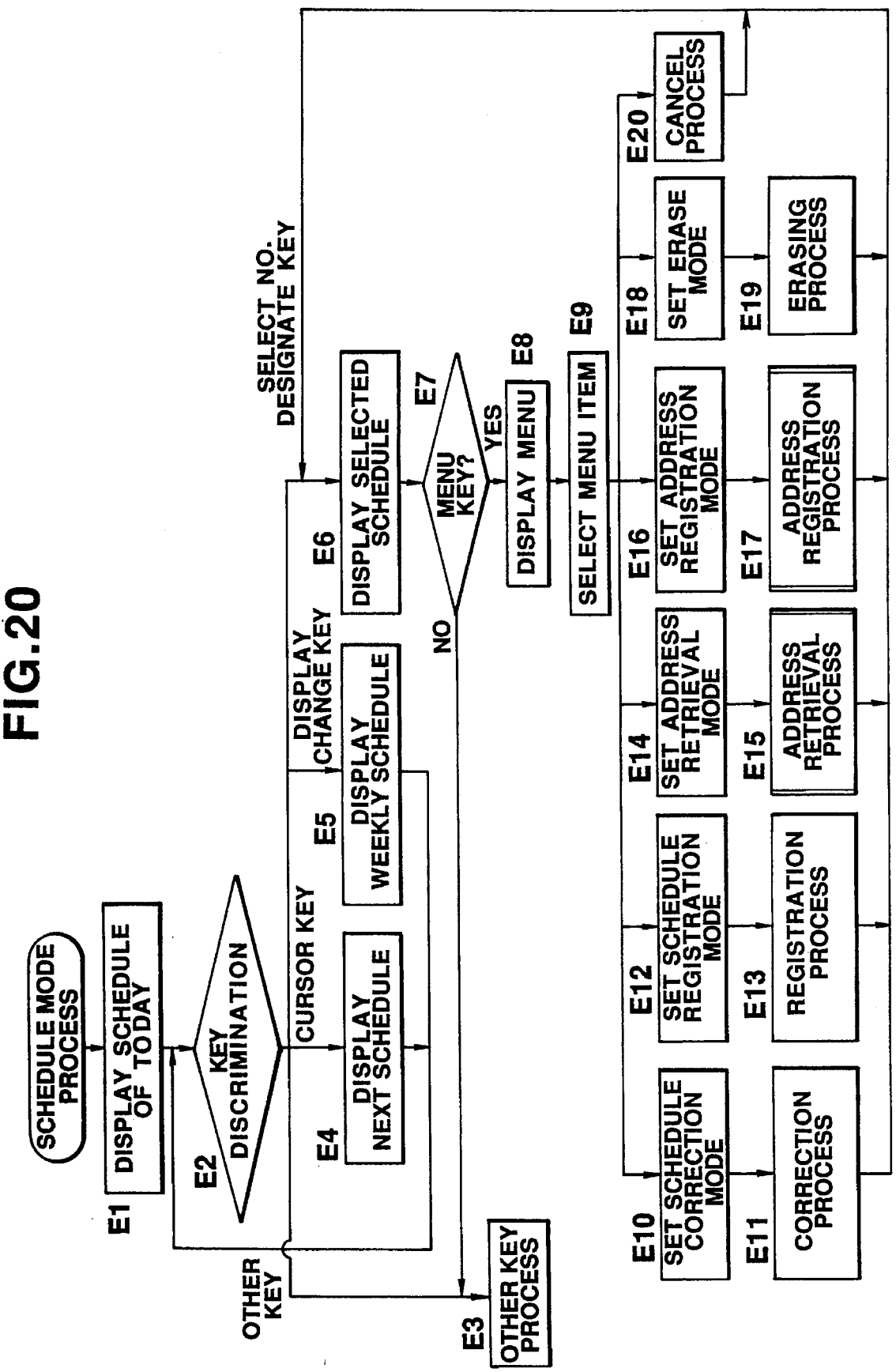
FIG. 20 is a flowchart for explaining a schedule mode process.
Figure 23:
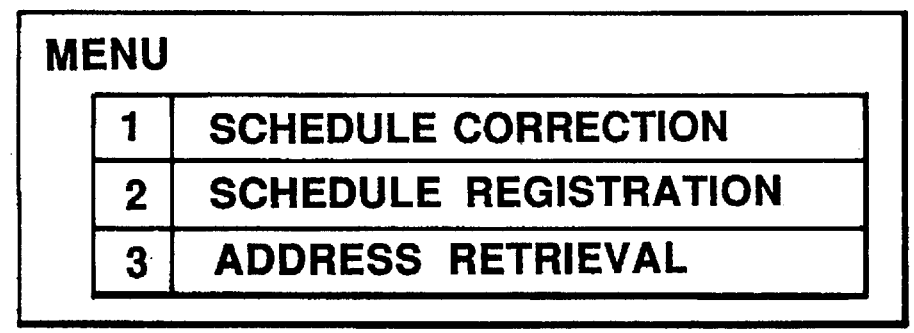
FIG. 23 is a diagram showing an example of a selection menu displayed in the schedule mode process of FIG. 20.

The schedule mode process will be described next referring to the flowchart given in FIG. 20. When the schedule key 8 of FIG. 1 is pushed down, a schedule key input signal is input to the CPU 28 from the key input section 27 and the schedule mode process will be initiated. First, schedule data is read out from the schedule data storage area 29b in the RAM 29. A schedule of today, as shown in FIG. 21, is displayed on the display section 32 (step E1). It is then discriminated whether the subsequent input key is the cursor keys 17, the display change key 12, the select number designate key (numeric key) or some other key (step E2). If the input key is some other key, a process designated by that input key will be initiated (step E3). If the input key is one of the cursor keys 17, the next schedule is displayed (step E4). The process then returns to the input key discrimination in step E2. If the input key is the display change key 12, a weekly schedule, as shown in FIG. 22, will be displayed before the process returns to the input key discrimination in step E2 (step E5). If the input key is the select number designate key, the schedule data of the selected number will be displayed on the display section 32 (step E6). The display of the schedule data may be such as shown in FIG. 16. Then, it is determined whether or not the menu key 16 is depressed (step E7). If a key other than the menu key 16 is depressed, a process designated by that key input will be initiated (step E3). On the other hand, when the menu key 16 is depressed, a menu will be displayed on the display section 32, as shown in FIG. 23, to be selected by the user (steps E8 and E9). Schedule correction mode, schedule registration mode, address retrieval mode, address registration mode and erase mode can be selected by the user in the step E9 of FIG. 20.

Figure 24:
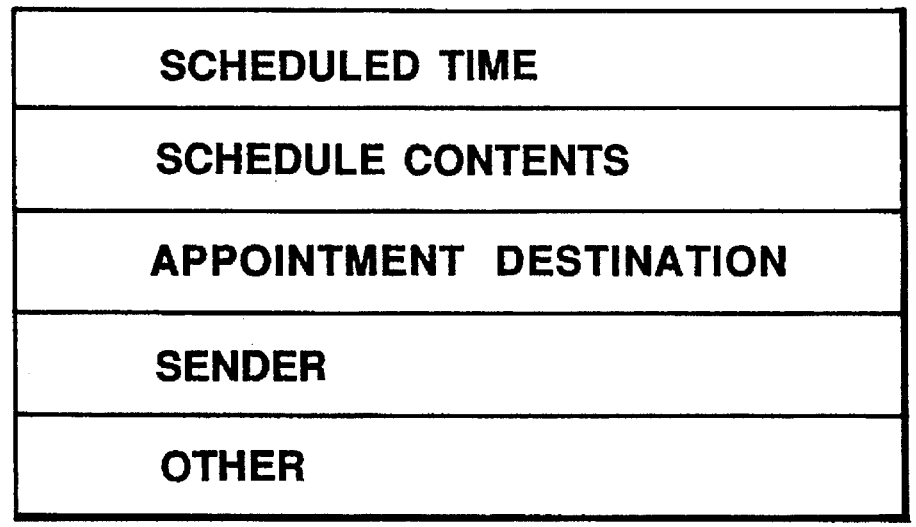
FIG. 24 is a diagram illustrating an example of a guidance display displayed in a schedule registration process used in the schedule mode process of FIG. 20.

If the schedule correction mode is set in the menu selection step in step E9 (step E10), the schedule data of the selected number stored in the RAM 29 is rewritten by the operation of the data entry keys 4 (step E11) and the process returns to the display of the selected schedule in step E6. If the schedule registration mode is set in the menu selection step in step E9 (step E12), a menu for individual items of FIG. 24 used for schedule registration process will be displayed on the display section 32 to request the registration of the schedule data for the user. The schedule data are scheduled time, schedule contents, appointment destination, sender and other. The schedule data input by the operation of the data entry keys 4 is stored in an empty area in the schedule data storage area 29b in the RAM 29 (step E13). Thereafter, the process returns to the display of the selected schedule in step E6. If the address retrieval mode is set in the menu selection in step E9 (step E14), a process for the address retrieval mode, which will be described in detail later, is executed (step E15). The process then returns to the display of the selected address in step E6. If the address registration mode is set in the menu selection in step E9 (step E16), a process for the address registration mode, which will also be described in detail later, is executed (step E17) before the process returns to the display of the selected schedule in step E6. If the erase mode is set by the menu selection in step E9 (step E18), erasure of the address data of the selected number in the schedule data storage area 29b in the RAM 29 is executed (step E19). The process then returns to the display of the selected schedule in step E6. If the cancel process is designated in the menu selection in step E9, the menu display is cancelled. Then the process returns to the display of the selected schedule in step E6 (step E20).

Figure 25:
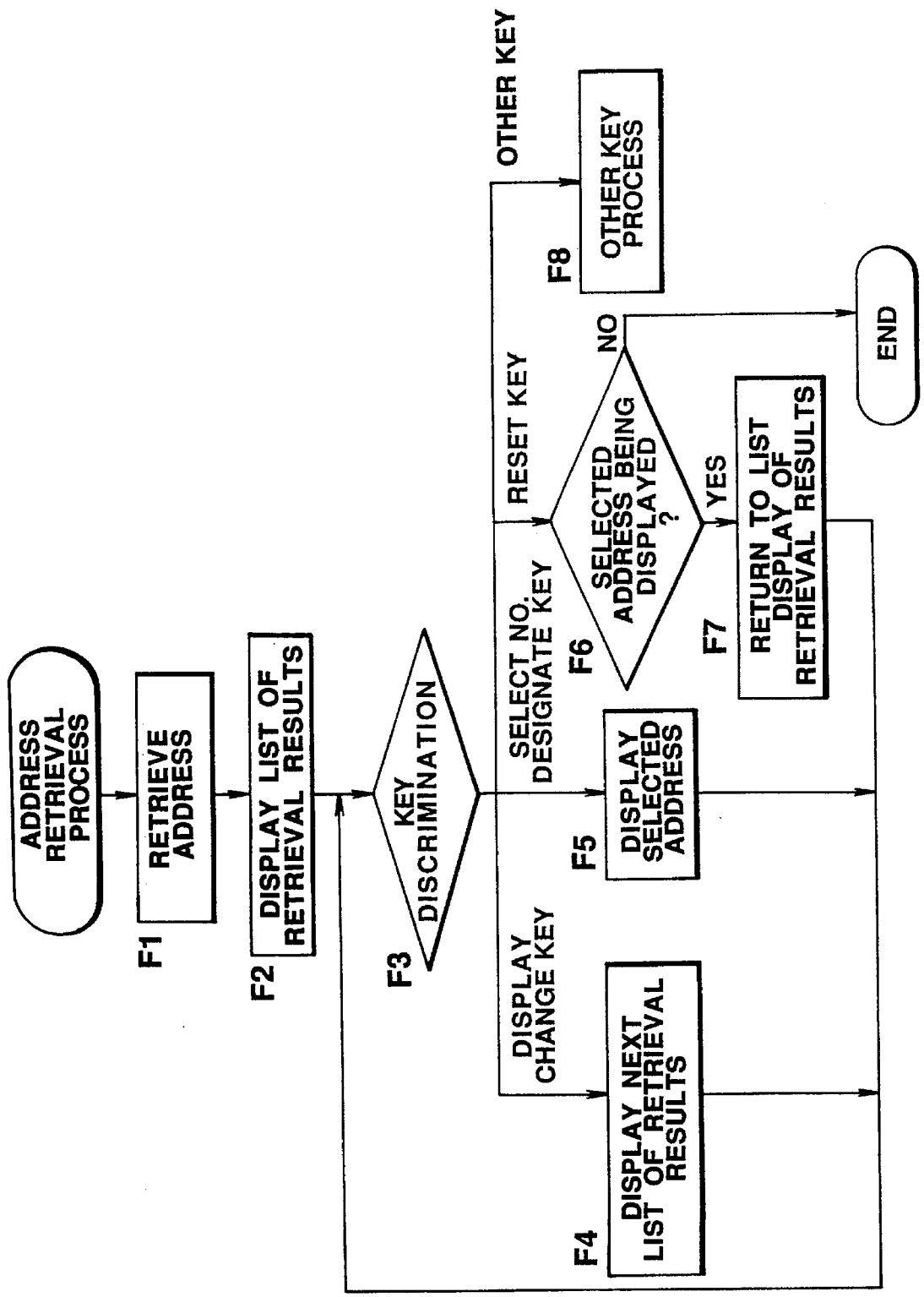
FIG. 25 is a flowchart for explaining an address retrieval mode process performed in the schedule mode process of FIG. 20.

With reference to FIG. 25, the address retrieval process in step E15 in the schedule mode process of FIG. 20 will now be described. First, an address data in which the company name and/or a person's name in the address data stored in the address data storage area 29a in the RAM 29 matches with the appointment destination in the currently selected schedule data is retrieved (step F1). A list of retrieval results will be displayed on the display section 32, as shown in FIG. 27, when there are a few associated items (step F2). Then, it is determined whether the input key is the display change key 12, the select number designate key (numeric key), or the reset key 14 (step F3). If it is the display change key 12, the next list of retrieval results will be displayed (step F4). The process then returns to the input key discrimination in step F3. If the input key is the select number designate key, the address designated by the selected number will be displayed on the display section 32 (step F5) before the process returns to the input key discrimination in step F3. The display of the address in step F5 may be as shown in FIG. 11. If the input key is the reset key 14, it is then determined whether or not the selected address is being displayed on the screen (step F6). Unless the selected address is being displayed on the screen, the process will be terminated without returning to the step E6 in the schedule mode process of FIG. 20. If the selected address is being displayed on the screen, the process proceeds to the display of a list of retrieval results (step F7). The process then returns to the input key discrimination in step F3. If the input key is some other key, a process designated by the input key will be initiated (step F8).

Figure 28:
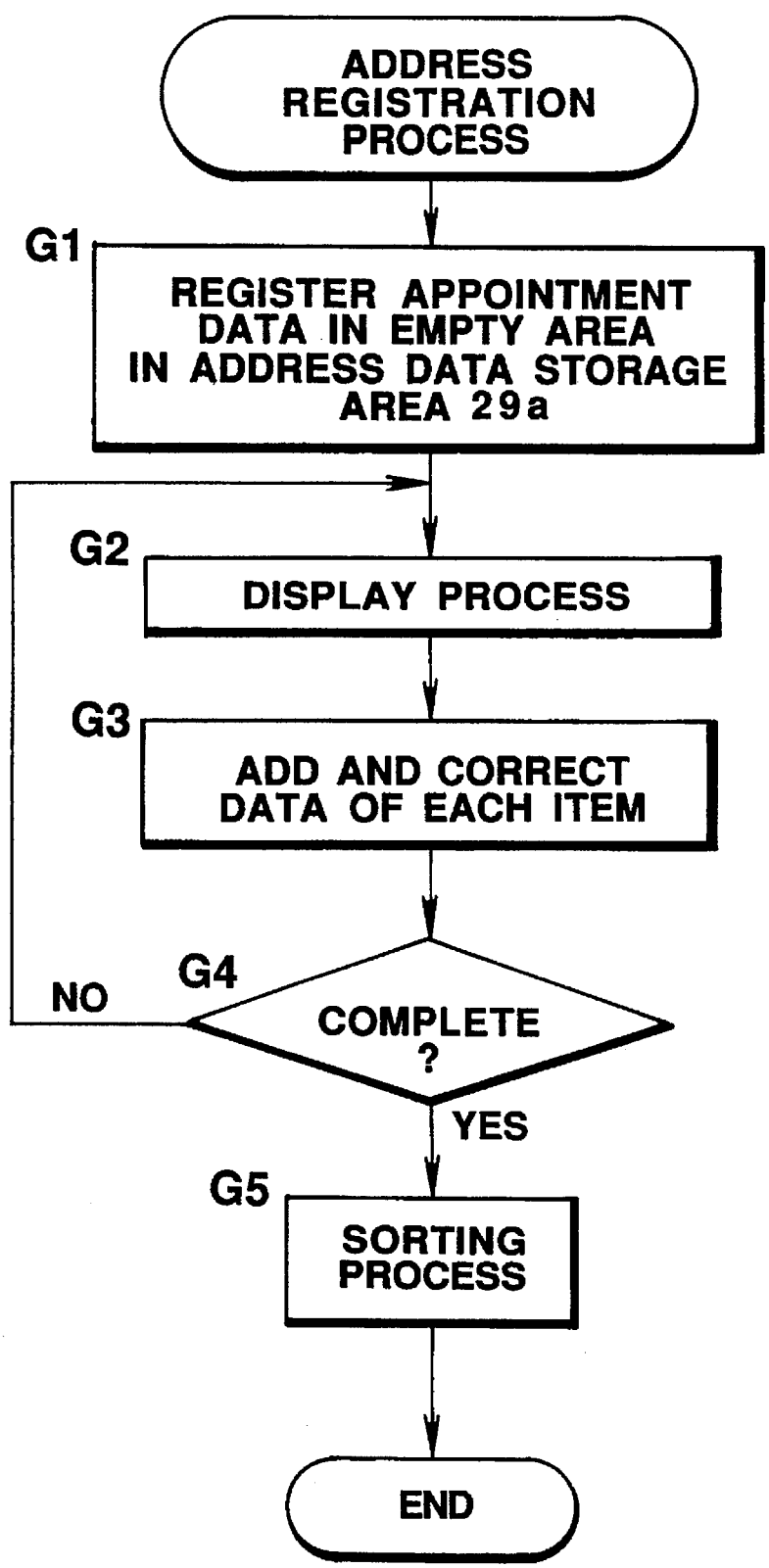
FIG. 28 is a flowchart for explaining an address registration mode process performed in the schedule mode process of FIG. 20.

With reference to FIG. 28, the address registration process in step E17 in the schedule mode process of FIG. 20 will now be described. First, the appointment destination data in the selected schedule data is read out and is registered in an empty area in the address data storage area 29a in the RAM 29 (step G1). A displaying process of the registered address data or the appointment destination data is performed (step G2). Addition and correction operations of each item data in the address data is then performed (step G3). It is then determined if the correction has been completed (step G4). If the correction has not been completed yet, the process returns to the step G2 to repeat the correction operation. While, if the correction has been completed, the address data stored in the address data storage area 29a is sorted in alphabetical order before terminating this process (step G5).

Figure 29:
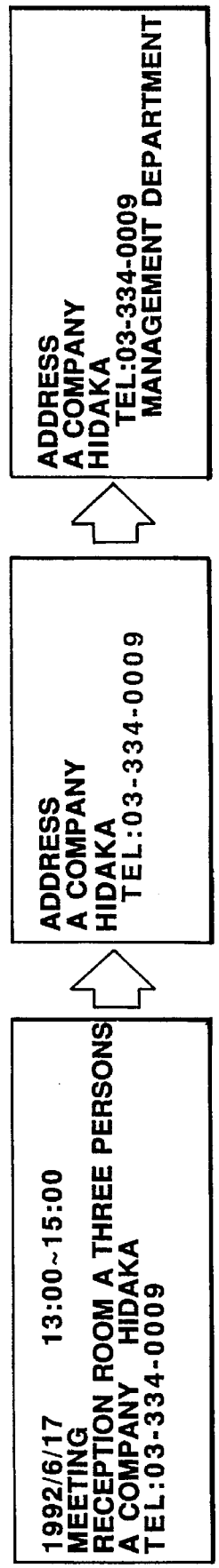
FIG. 29 is a view illustrating display screens which show a relationship between schedule data targeted for address registration and the address registration data.

FIG. 29 shows the relationship between the selected schedule data targeted for the address registration and the registered address data on the display screen. The display screen on the left side in FIG. 29 shows the selected schedule data in step E6 in FIG. 20. The center display screen shows the registered address data when the process advances to step G2 from step G1 in FIG. 28. The display screen on the right side in FIG. 29 shows the registered address data in step G2 after addition of item data has been performed in step G3 in FIG. 28.

Memo Mode Process

Figure 30:
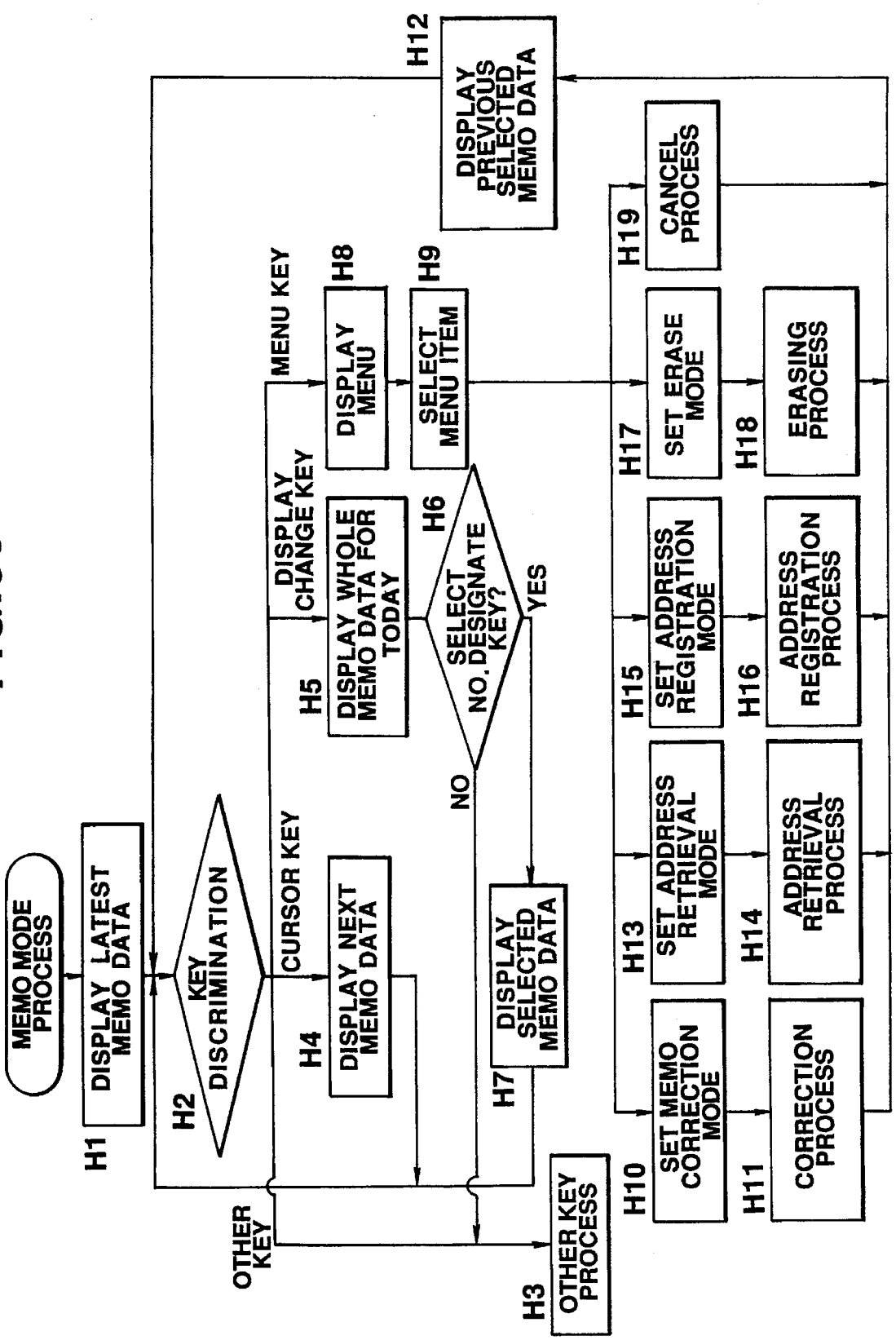
FIG. 30 is a flowchart for explaining a memo mode process.
Figure 31:
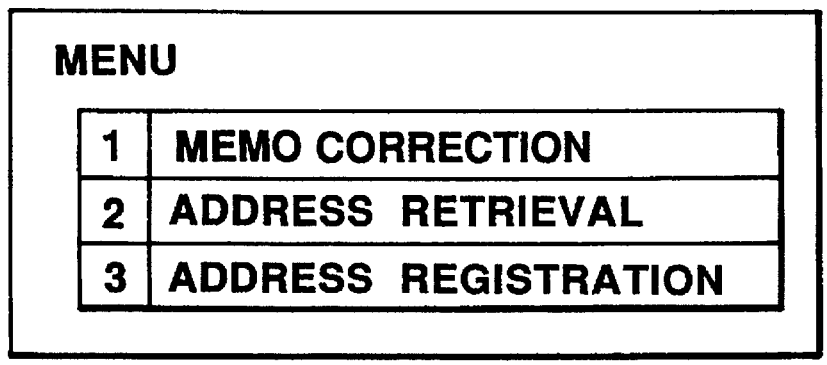
FIG. 31 is a diagram illustrating an example of a selection menu displayed in the memo mode process of FIG. 30.

The memo mode process will be described next referring to the flowchart given in FIG. 30. When the memo key 9 of FIG. 1 is depressed, a memo key input signal is input to the CPU 28 from the key input section 27 and the memo mode process will be initiated. First, the latest memo data is read out from the memo data storage area 29c in the RAM 29. The latest memo data is displayed on the display section 32 (step H1). This display of the latest memo data may be as shown in FIG. 19. It is then discriminated whether the subsequent input key is the cursor keys 17, the display change key 12, the menu key 16 or some other key (step H2). If the input key is some other key, a process designated by the input key will be initiated (step H3). If the input key is one of the cursor keys 17, the next memo data is displayed (step H4). If the input key is the display change key 12, a batch display of the memo data of today is executed (step H5). It is determined if the subsequent input key is the select number designate key (numeric key) (step H6). If it is not the select number designate key, a process according to that input key is initiated (step H3). If the input key is the select number designate key, the memo data of the selected number will be displayed (step H7) before the process returns to the input key discrimination in step H2. If the input key is discriminated as the menu key 16 in the input key discrimination in step H2, a menu will be displayed, as shown in FIG. 31, to be selected by the user (steps H8 and H9). In the step H9 of FIG. 30, memo correction mode, address retrieval mode, address registration mode and erase mode can be selected by the user.

If the memo correction mode is set in the menu selection in step H9 (step H10), the memo data of the selected number in the RAM 29 is rewritten by the operation of the data entry keys 4 (step H11). Previously selected memo data is displayed on the display screen of the display section 32 (step H12) before the process returns to the input key discrimination in step H2. When the address retrieval mode process is set in the memo selection in step H9 (step H13), the address data which contains a name that matches with the transmitter of the memory data is retrieved (step H14). A list of retrieval results becomes the same as the one shown in FIG. 27. If the address registration mode is set in the menu selection in step H9 (step H15), a process which is nearly the same as the address registration mode process shown in FIG. 28 will be executed (step H16). Previously selected memo data is also displayed on the display screen of the display section 32 (step H12) before the process returns to the input key discrimination in step H2. When the address registration mode process is set in the step H9 of this memo mode, sender's name data in the memo data is registered as name data in an empty area in the address data storage area 29a in the RAM 29. If the erase mode is set in the menu selection in step H9 (step H17), erasure of the memo data of the selected number in the memo data storage area 29c in the RAM 29 is performed (step H18). Previously selected memo data is also displayed on the display screen of the display section 32 (step H12) and then the process returns to the input key discrimination in step H2. If the cancel process is designated in the menu selection in step H9, the menu display is cancelled (step H19). Previously selected memo data is also displayed on the display screen of the display section 32 (step H12). The process then returns to the input key discrimination in step H2.

Figure 32:
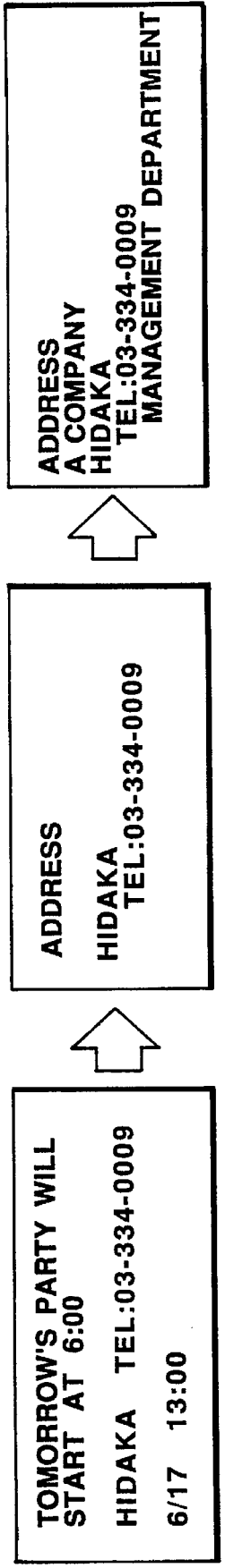
FIG. 32 is a view illustrating display screens which show a relationship between memo data targeted for address registration and the address registration data.

FIG. 32 shows the relationship between the selected memo data targeted for the address registration and the registered address data on a display screen. The display screen on the left side in FIG. 32 is a screen of the selected memo data which has been displayed on the display section 32 before the depression of the menu key 16 in the memo mode process in FIG. 30. The center display screen shows the registered address data when the process enters the address registration mode. The display screen on the right side shows the registered address data after addition of item data has been performed.

Normal Message Mode Process

Figure 34:
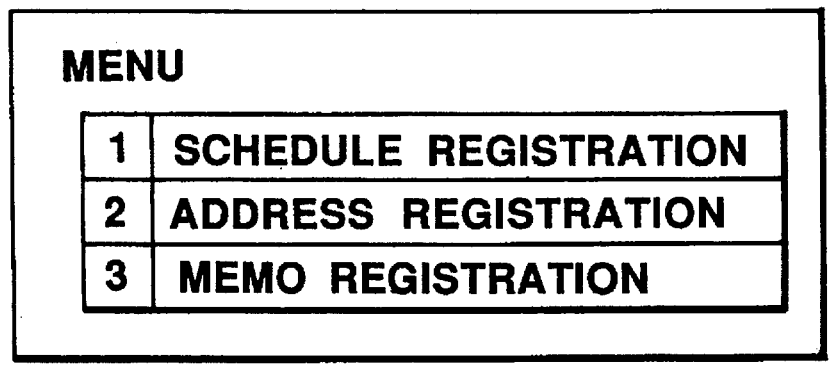
FIG. 34 is a diagram showing an example of a selection menu displayed in the normal message mode process of FIG. 33.
Figure 33:
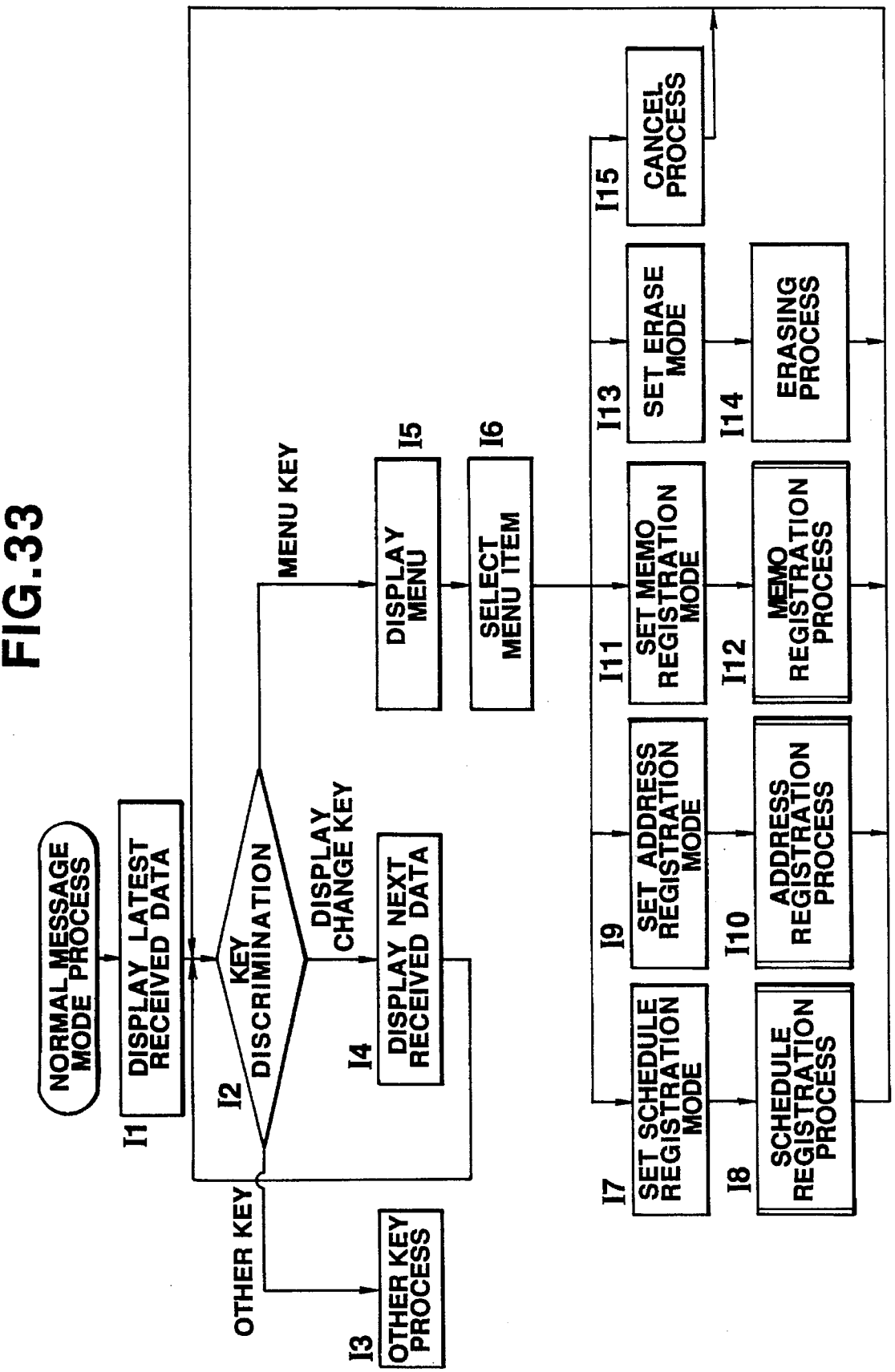
FIG. 33 is a flowchart for explaining a normal message mode/process.

Now the normal message mode process will be described referring to the flowchart shown in FIG. 33. When the message key 10 of FIG. 1 is pushed, a message key input signal is input to the CPU 28 from the key input section 27 and the normal message mode process will be initiated. First, the latest received data is read out from the normal message data storage area 29d in the RAM 29 and is displayed on the display section 32 (step I1). It is then discrimination whether the subsequent input key is the display change key 12, the menu key 16 or some other key (step I2). If the input key is some other key, a process designated by that other key input will initiated (step I3). If the input key is display change key 12, the next received data will be displayed on the display screen of the display section 32 (step I4). Thus the process returns to the input key discrimination in step I2. If the input key is the menu key 16, a menu will be displayed, as shown in FIG. 34, to be selected by the user (steps I5 and I6).

Figure 36:
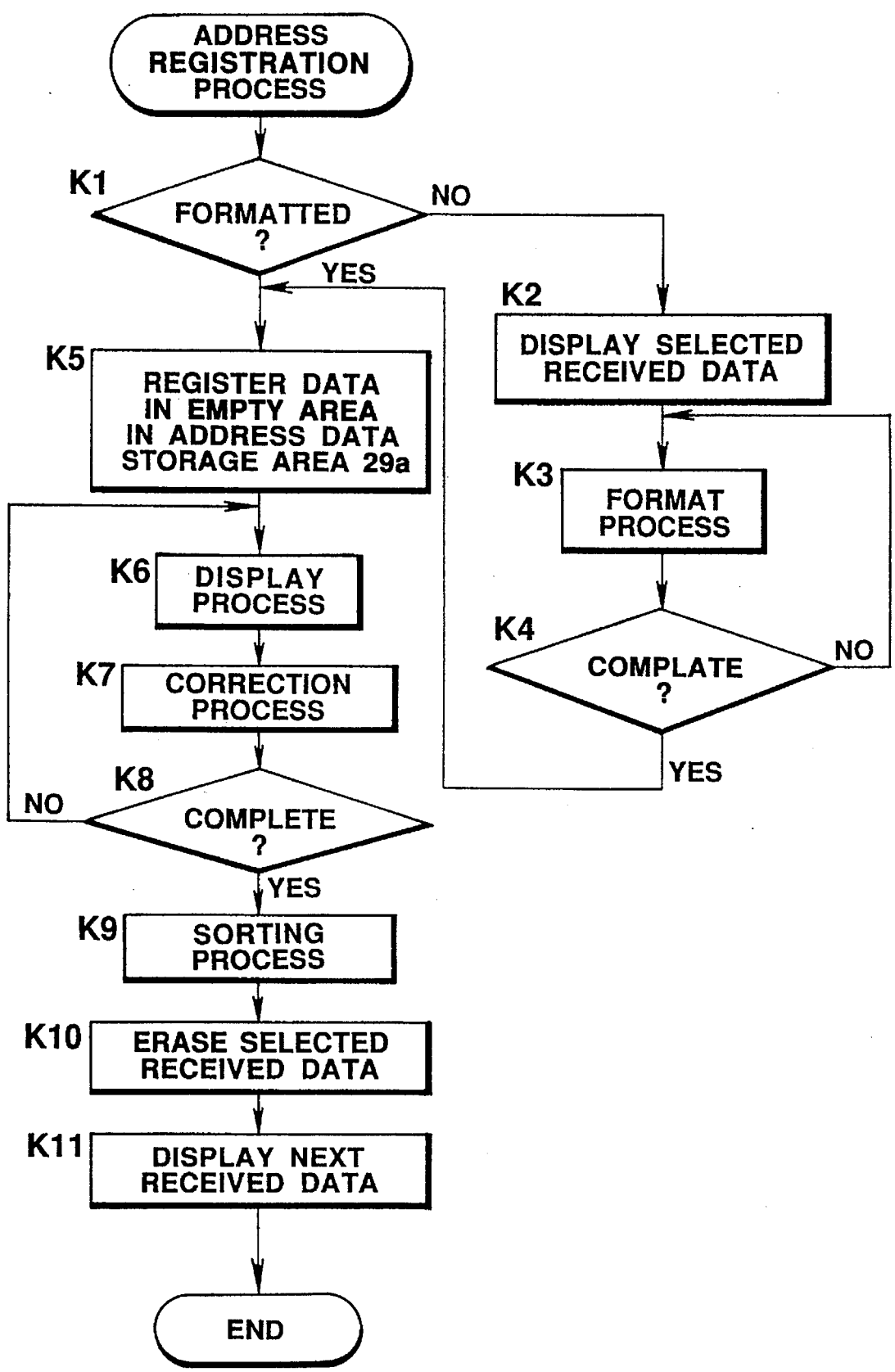
FIG. 36 is a flowchart for explaining an address registration mode process performed in the normal message mode process of FIG. 33.
Figure 37:
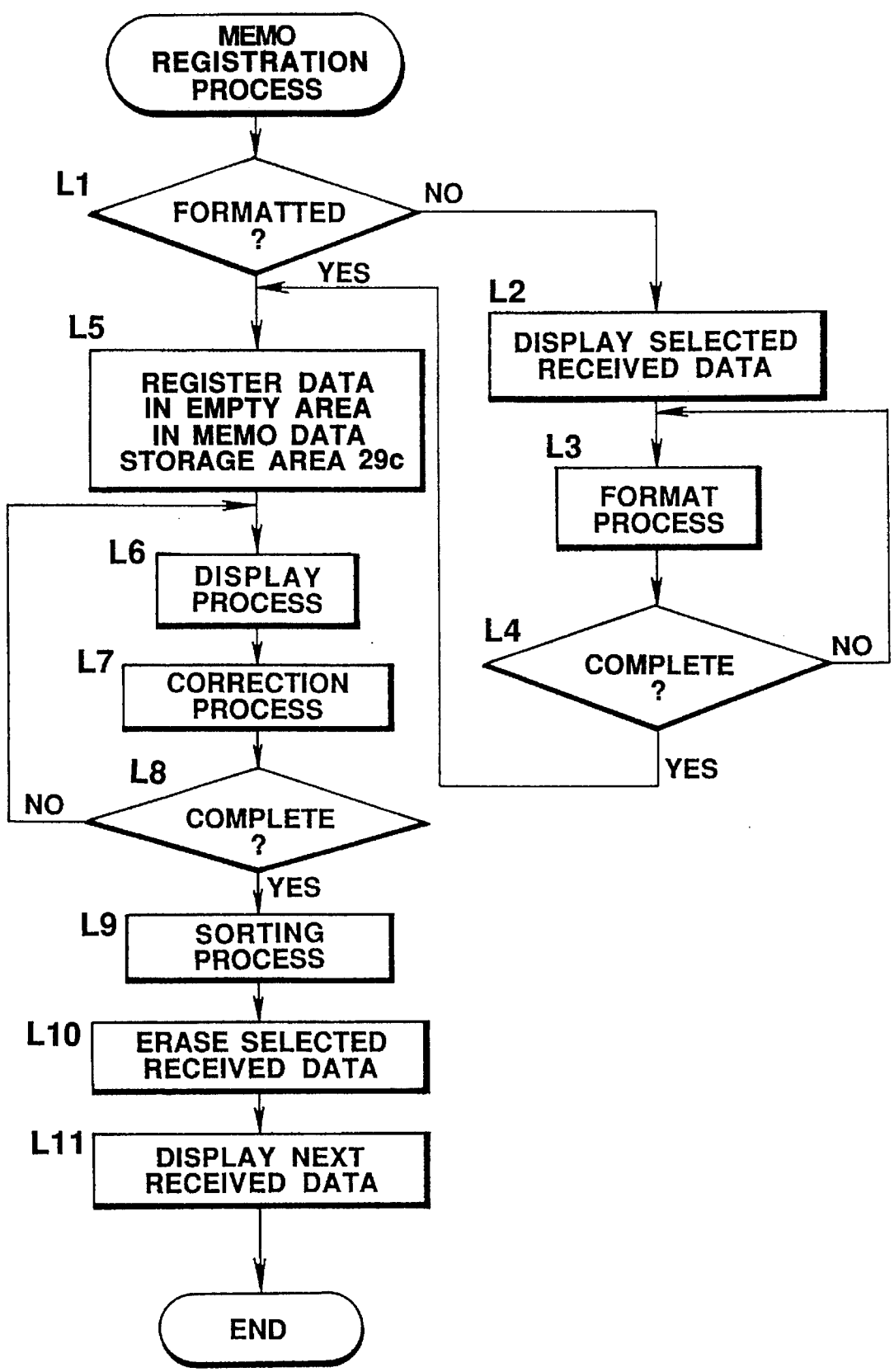
FIG. 37 is a flowchart for explaining a memo registration mode process performed in the normal message mode process of FIG. 33.

If the schedule registration mode is set in the menu selection in step I6 (step I7), the process advances to the schedule registration process to execute the process of the flowchart which is described later (step I8). The process then returns to the input key discrimination in step I2. When the address registration mode is set by the menu selection in step I6 (step I9), the address registration mode process is initiated. The process of the flowchart in FIG. 36 is executed (step I10) before returning to the input key discrimination in step I2. When the memo registration mode is set by the menu selection in step I6 (step I11), the memo registration mode process is initiated and the process of the flowchart in FIG. 37 is executed (step I12). The process returns to the input key discrimination in step I2. If the erase mode in set by the menu selection in step I6 (step I13), the selected received data stored in the normal message data storage area 29d is erased (step I14). The process returns to the input key discrimination in step I2. When the cancel process is selected in the menu selection in step I6, the menu display is cancelled (step I5) before the process returns to the input key discrimination in step I2 of FIG. 33.

Figure 35:
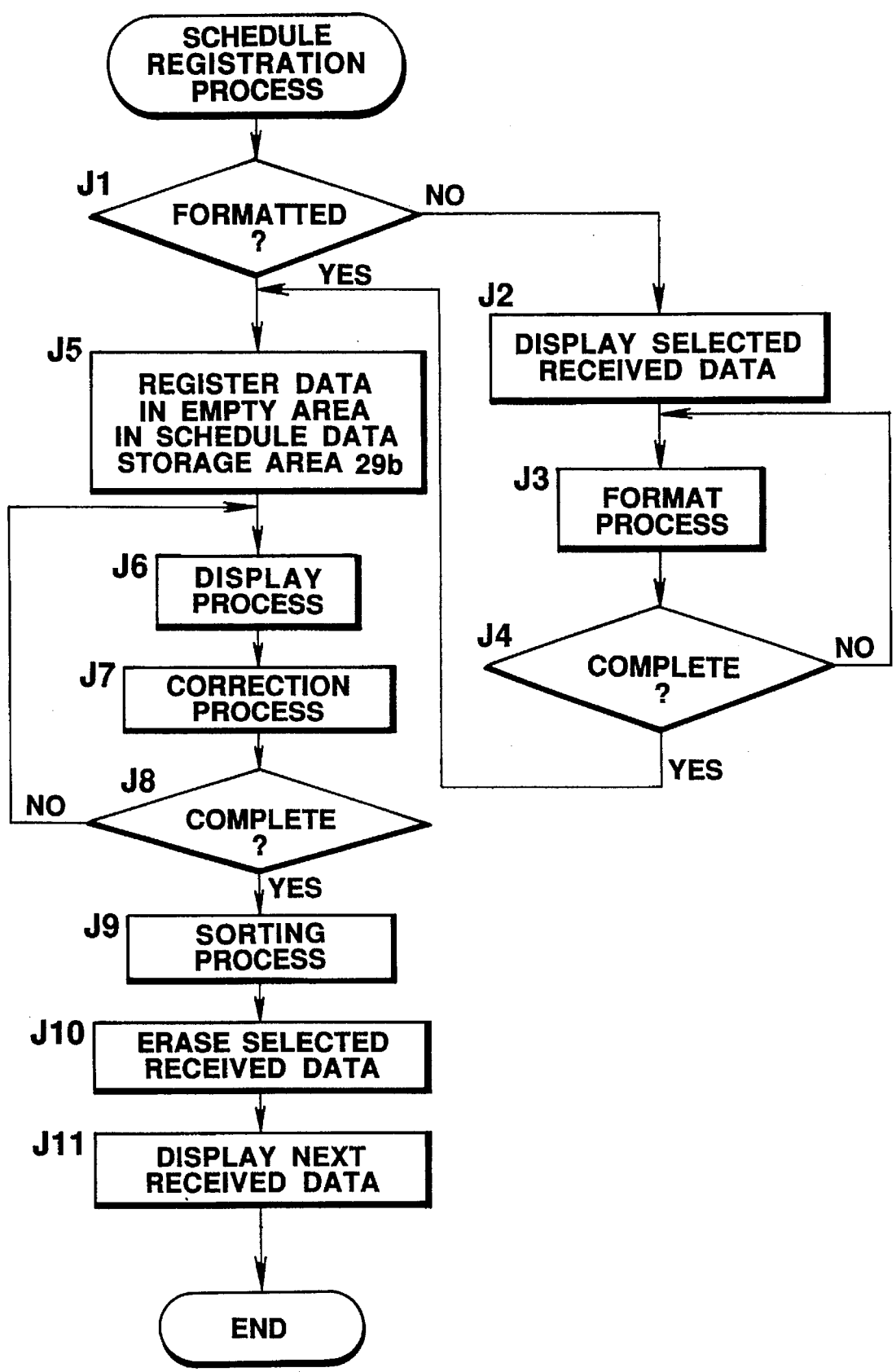
FIG. 35 is a flowchart for explaining a schedule registration mode process performed in the normal message mode process of FIG. 33.

Referring to FIG. 35, the schedule registration process in the step I8 of FIG. 33 will now be described. First, it is determined if the received data is formatted as schedule data (step J1). That is, if the item data such as the scheduled time information, schedule contents and appointment destination, are separated by item separating codes or the like. It is determined if the received data is schedule data where the transmitter has forgotten to add the information identification codes in the index data portion of the transmission data format shown in FIG. 5 when the data is transmitted. If the selected received data has formatted as schedule data, the process advances to step J5. Otherwise, the process goes to step J2 to display the selected received data on the display section 32, requesting formatting process of the schedule data (step J3). In the formatting process in step J3, addition or correction of necessary item data, insertion of item separation codes or the like is performed by the operation of the data entry keys 4. When the formatting process is complete (step J4), the process also advances to step J5. The received data which is determined to be already formatted as schedule data or the received data formatted to be schedule data in step J3 is stored in an empty area in the schedule data storage area 29b in the RAM 29 (step J5). Then, the registered schedule data is displayed on the display section 32 to request for further correction (step J6). When the correction of the registered schedule data is completed (steps J7 and J8), the schedule data in the schedule data storage area 29b is sorted in the order of the date and time (step J9). Then, the selected received data in the normal message data storage area 29d is erased (step J10). The next received data is displayed (step J11) before the process is ended. The process then returns to the normal message mode process in FIG. 33.

Referring to FIG. 36, the address registration mode process in the step I10 of FIG. 33 will now be explained. First, it is determined if the selected received data is formatted as address data (step K1). That is if the received data is address data where the information identification codes has not been added in the index data portion of the transmission data format shown in FIG. 5 by the sender when the data is transmitted. If the selected received data is data having formatted as address data, the process advances to step K5. Otherwise, the process goes to step K2 to display the selected received data on the display section 32, requesting formatting process of the address data. In the formatting process in step K3, addition or correction of necessary item data, insertion of item separation codes or the like is performed by the operation of the data entry keys 4, and when the formatting is complete (step K4), the process also proceeds to step K5. The received data which has been determined to be already formatted as address data or the received data formatted to be address data in step K3 is stored in an empty area in the address data storage area 29a in the RAM 29 (step K5). Then, the registered address data is displayed on the display section 32 to request for further correction (step K6). When the correction of the registered address data is completed (steps K7 and KS), the address data stored in the address data storage area 29a is sorted in alphabetical order of the names (step K9). Then, the selected received data in the normal message data storage area 29d is erased (step K10). The next received data is displayed (step K11) before terminating this process. The process returns to the normal message mode process in FIG. 33.

Referring to FIG. 37, the memo registration process in the step I12 of FIG. 33 will now be explained. First, it is determined if the selected received data has been formatted as memo data (step L1). If the received data is memo data where the information identification codes has not been added in the index data portion of the transmission data format shown in FIG. 5 by the sender when the data is transmitted. If the selected received data is data having formatted as memo data, the process advances to step L5. Otherwise, the process goes to step L2 to display the selected received data on the display section 32, requesting formatting process of the memo data (step L3). In the formatting process in step L3, addition or correction of necessary item data, insertion of item separation codes or the like is performed by the operation of the data entry keys 4. When the formatting process is complete (step L4), the process also advances to step L5. The received data which has been determined to be already formatted as memo data or the received data formatted to be memo data in step L3 is stored in an empty area in the memo data storage area 29c in the RAM 29 (step L5). Then, the registered memo data is displayed on the display section 32 to request for further correction (step L6). When the correction of the registered memo data is completed (steps L7 and L8), the memo data stored in the memo data storage area 29c is sorted in the order of the reception date and time (step L9). Then, the selected received data in the normal message data storage area 29d is erased (step L10). The next received data is displayed (step L11) before terminating this process. The process returns to the normal message mode process in FIG. 33.

Original Data Mode Process

Figure 38:
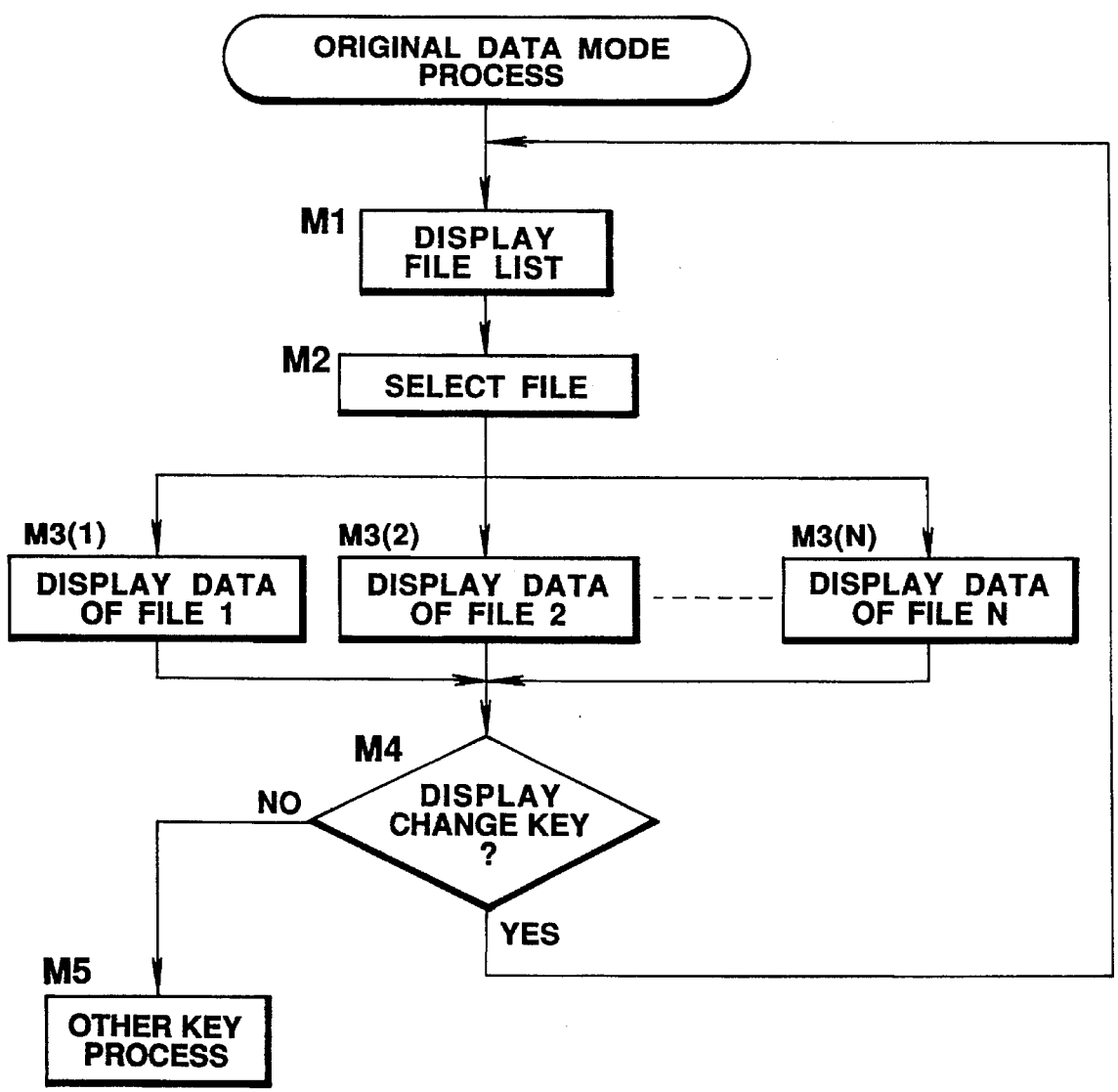
FIG. 38 is a flowchart for explaining an original data mode process.

The original data mode process will be described referring to the flowchart in FIG. 38. When the original key 11 of FIG. 1 is depressed, an original key input signal is input to the CPU 28 from the key input section 27 and the original data mode process is initiated. First, a list of original data formats set by the user is displayed on the display section 32, requesting selection of a file to be processed (step M1). When the user performs a key operation to select the desired file (step M2), the data of the selected file is read out from the original data storage area 29e in the RAM 29 and is displayed on the display section 32 (steps M3(1) to M3(N)). An example of the display of the file data is shown in FIG. 39. Then, it is determined whether or not the operated key is the display change key 12 (step M4). If the operated key is the display change key 12, the process returns to the display of the file list in step M1. On the other hand, if it is some other key, a process designated by that other key will be executed (step M5).

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information managing apparatus comprising:

information inputting means for inputting various types of information, each of said various types of information including a plurality of data items in a predetermined format;

a plurality of storing means, each storing means having storage areas in which said plurality of data items of one type of information are stored, and for storing information which is input from said information inputting means;

first designating means for designating one of said storing means so as to display selectively information having given data items of information and which are stored in storage areas of a designated one of said storing means;

means for displaying said information stored in that one of said storing means designated by said first designating means;

second designating means for designating selectively a mode in which registration of a specified given data item of information which is designated by said first designating means and being displayed into another of said storing means is to be executed and a mode in which retrieval of information corresponding to the specified given data item of information which is designated by said first designating means and being displayed from another of said storing means is to be executed while said displaying means is displaying said information stored in said one of said storing means and designated by said first designating means; and means for executing both registration of said a specified given data item of information which is being displayed into said another of said storing means and retrieval of said specified given data item of information from said another of said storing means in accordance with said mode designated by said second designating means while said displaying means is displaying said information stored in said one of said storing means which was designated by said first designating means.

2. The apparatus according to claim 1, wherein said information inputting means comprises at least one of a keyboard, a radio receiver and a connector which is arranged to be connected to an external apparatus through a communication cable.

3. The apparatus according to claim 1, wherein two of said plurality of storing means are an address data storing means and a schedule data storing means, respectively, and said specified data item of information is a data item relating to a personal name.

4. The apparatus according to claim 1, wherein two of said plurality of storing means are an address data storing means and a memo data storing means, respectively, and said specified data item of information is a data item relating to a personal name.

5. The apparatus according to claim 1, wherein said specified data item of information is a data item relating to a personal name.

6. The apparatus according to claim 1, wherein said executing means comprises means for enabling a registration of an another data item of said plurality of data items into said another storing means, after said registration of said specified data item into said another storing means is completed.

7. The apparatus according to claim 1, wherein said various types of information includes index data indicating the type of information, and said information inputting means receives information which is transmitted from an external device, and wherein the apparatus further includes:

means for detecting the index data in the information received by said information inputting means and for discriminating the type of said received information based on the index data detected by said detecting means; and control means for storing said received information in the corresponding one of said storing means in accordance with the type of information discriminated by said detecting means.

8. The apparatus according to claim 7, wherein said control means stores information received by said information inputting means in different storing means from said plurality of storing means, when said detecting means does not detect index data in said received information.

9. The apparatus according to claim 8, further comprising:

means for reading out said information from said different storing means; and means for formatting said information read out by said reading means such that said type of information has a plurality of data items, whereby said information is allowed to be registered in said plurality of said storing means.

10. An information managing apparatus comprising:

information inputting means for inputting function mode information of various formats used for a plurality of function modes, each function mode information including a plurality of data items in a predetermined format;

a plurality of storing means, each storing means being provided independently and correspondingly to one of said function modes and each storing means having storage areas in which said plurality of data items of information of a corresponding format are stored, and for storing information input from said information inputting means;

means for displaying selectively said function mode information of various formats;

first mode selecting means for selecting one of said plurality of function modes to selectively display information stored in storage areas of one of said storing means which corresponds to the selected one function mode on said displaying means;

second mode selecting means for selecting one of a plurality of processing modes while one of said plurality of function modes is selected, and said plurality of processing modes includes registration of a pieces of information which is selected by said first mode selecting means and being displayed into a different storing means of said plurality of storing means different from the one storing means which corresponds to the selected function mode by said first mode selecting means and retrieval of information corresponding to information which is selected by said first mode selecting means and being displayed from the different storing means of said plurality of storing means different from the one storing means which corresponds to the selected function mode by said first mode selecting means; and means for enabling said first mode selecting means and said second mode selecting means to independently operate, and for executing both said registration and said retrieval while said one of said function modes is being selected, without changing of mode selection by said first mode selecting means.

11. The apparatus according to claim 10, wherein said enabling means executes registration/retrieval of information of said different one of said function modes to/from a corresponding one of said storing means when information of said one of said function modes is being displayed, without changing of mode selection by said display mode selecting means.

12. The apparatus according to claim 10, wherein said plurality of function modes includes at least one of address note function, schedule function and memo function.

13. The apparatus according to claim 10, wherein said information inputting means comprises at least one of a keyboard, a radio receiver and a connector which is arranged to be connected to an external apparatus through a communication cable.

14. The apparatus according to claim 10, wherein said specified data item of information is a data item relating to a personal name.

15. The apparatus according to claim 10, wherein said executing means comprises means for enabling a registration of an another data item of said plurality of data items into said another storing means, after said registration of said specified data item into said another storing means is completed.

16. The apparatus according to claim 10, wherein said enabling means executes said registration and said retrieval of information using a piece of related information of said data items included in said information of said one of said function modes.

17. The apparatus according to claim 16, wherein said displaying means displays registered/retrieved information.

18. The apparatus according to claim 10, wherein said various types of information includes index data indicating the type of information, and said information inputting means receives information which is transmitted from an external device, and wherein the apparatus further includes:

means for detecting the index data in the information received by said information inputting means and for discriminating the type of said received information based on the index data detected by said detecting means; and control means for storing said received information in the corresponding one of said storing means in accordance with the type of information discriminated by said detecting means.

19. The apparatus according to claim 18, wherein said control means stores information received by said information inputting means in different storing means from said plurality of storing means, when said detecting means does not detect index data in said received information.

20. The apparatus according to claim 19, further comprising:

means for reading out said information from said different storing means; and means for formatting said information read out by said reading means such that said type of information has a plurality of data items, whereby said information is allowed to be registered in said plurality of said storing means.

21. An information managing apparatus comprising:

receiving means for receiving information transmitted from an external apparatus;

means for discriminating whether an index data is included in received information from said receiving means;

first storing means for storing said received information into corresponding storage areas which are divided for every index data in accordance with said index data when said index data is included in said received information;

second storing means for temporarily storing said received information having no index data into a different storage area when said index data is not included in said received information;

means for reading out said received information having no index data from said different storage area;

means for determining whether said received information is formatted;

means for temporarily registering said received information into said corresponding storage areas when said received information is formatted; and means for formatting said received information when said received information is not formatted and for registering received and formatted information into said corresponding storage areas.

22. The apparatus according to claim 21, wherein said index data indicates one of address data, schedule data and memo data.

23. An information managing apparatus comprising:

information inputting means for inputting various types of information, each of said various types of information including a plurality of data items in a predetermined format;

a plurality of storing means, each storing means having storage areas in which said plurality of data items of one type of information are stored, and for storing information which is input from said information inputting means;

first designating means for designating one of said storing means so as to display selectively information having given data items of information and which are stored in storage areas of a designated one of said storing means;

means for displaying said information stored in that one of said storing means designated by said first designating means;

second designating means for designating selectively a mode in which registration of a specified given data item of information which is designated by said first designating means and being displayed into another of said storing means is to be executed and a mode in which retrieval of information corresponding to the specified given data item of information which is designated by said first designating means and being displayed from another of said storing means is to be executed while said displaying means is displaying said information stored in said one of said storing means and designated by said first designating means; and means for executing registration of said specified given data item of information which is being displayed into said another of said storing means in accordance with said mode designated by said second designating means while said displaying means is displaying said information stored in said one of said storing means which was designated by said first designating means.

24. The apparatus according to claim 23, wherein said information inputting means comprises at least one of a keyboard, a radio receiver and a connector which is arranged to be connected to an external apparatus through a communication cable.

25. The apparatus according to claim 23, wherein two of said plurality of storing means are an address data storing means and a schedule data storing means, respectively, and said specified data item of information is a data item relating to a personal name.

26. The apparatus according to claim 28, wherein two of said plurality of storing means are an address data storing means and a memo data storing means, respectively, and said specified data item of information is a data item relating to a personal name.

27. The apparatus according to claim 23, wherein said specified data item of information is a data item relating to a personal name.

28. The apparatus according to claim 23, wherein said executing means comprises means for enabling a registration of an another data item of said plurality of data items into said another storing means, after said registration of said specified data item into said another storing means is completed.

29. The apparatus according to claim 23, wherein said various types of information includes index data indicating the type of information, and said information inputting means receives information which is transmitted from an external device, and wherein the apparatus further includes:

means for detecting the index data in the information received by said information inputting means and for discriminating the type of said received information based on the index data detected by said detecting means; and control means for storing said received information in the corresponding one of said storing means in accordance with the type of information discriminated by said detecting means.

30. The apparatus according to claim 29, wherein said control means stores information received by said information inputting means in different storing means from said plurality of storing means, when said detecting means does not detect index data in said received information.

31. The apparatus according to claim 30, further comprising:

means for reading out said information from said different storing means; and means for formatting said information read out by said reading means such that said type of information has a plurality of data items, whereby said information is allowed to be registered in said plurality of said storing means.

32. An information managing apparatus comprising:

information inputting means for inputting various types of information, each of said various types of information including a plurality of data items in a predetermined format;

a plurality of storing means, each storing means having storage areas in which said plurality of data items of one type of information are stored, and for storing information which is input from said information inputting means;

first designating means for designating one of said storing means so as to display selectively information having given data items of information and which are stored in storage areas of a designated one of said storing means;

means for displaying said information stored in that one of said storing means designated by said first designating means;

second designating means for designating a mode in which retrieval of information corresponding to a specified given data item of information which is designated by said first designating means and being displayed from at least two of said plurality of storing means different from the one of storing means designated by said first designating means is to be executed while said displaying means is displaying said information stored in said one of said storing means and designated by said first designating means; and means for executing retrieval of said specified given data item of information from said at least two of said storing means in accordance with said mode designated by said second designating means while said displaying means is displaying said information stored in said one of said storing means which was designated by said first designating means.

33. The apparatus according to claim 32, wherein said information inputting means comprises at least one of a keyboard, a radio receiver and a connector which is arranged to be connected to an external apparatus through a communication cable.

34. The apparatus according to claim 32, wherein two of said plurality of storing means are an address data storing means and a schedule data storing means, respectively, and said specified data item of information is a data item relating to a personal name.

35. The apparatus according to claim 32, wherein two of said plurality of storing means are an address data storing means and a memo data storing means, respectively, and said specified data item of information is a data item relating to a personal name.

36. The apparatus according to claim 32, wherein said specified data item of information is a data item relating to a personal name.

37. The apparatus according to claim 32, wherein said executing means executes retrieval of information corresponding to same specified given data item from said at least two of said storing means.

38. The apparatus according to claim 32, wherein said executing means executes retrieval of information from said at least two of said storing means, respectively.

39. The apparatus according to claim 32, wherein said various types of information includes index data indicating the type of information, and said information inputting means receives information which is transmitted from an external device, and wherein the apparatus further includes:

means for detecting the index data in the information received by said information inputting means and for discriminating the type of said received information based on the index data detected by said detecting means; and control means for storing said received information in the corresponding one of said storing means in accordance with the type of information discriminated by said detecting means.

40. The apparatus according to claim 39, wherein said control means stores information received by said information inputting means in different storing means from said plurality of storing means, when said detecting means does not detect index data in said received information.

41. The apparatus according to claim 40, further comprising:

means for reading out said information from said different storing means; and means for formatting said information read out by said reading means such that said type of information has a plurality of data items, whereby said information is allowed to be registered in said plurality of said storing means.

42. An information managing apparatus comprising:

information inputting means for inputting various types of information, each of said various types of information including a plurality of data items in a predetermined format;

a plurality of storing means, each storing means having storage areas in which said plurality of data items of one type of information are stored, and for storing information which is input from said information inputting means;

first designating means for designating one of said storing means so as to display selectively information having given data items of information and which are stored in storage areas of a designated one of said storing means;

means for displaying said information stored in that one of said storing means designated by said first designating means;

second designating means for designating selectively a mode in which registration of a specified given data item of information which is designated by said first designating means and being displayed into another of said storing means is to be executed and a mode in which retrieval of information corresponding to the specified given data item of information which is designated by said first designating means and being displayed from another of said storing means is to be executed while said displaying means is displaying said information stored in said one of said storing means and designated by said first designating means; and means for executing both registration and retrieval of a specified data item of information;

wherein said second designating means includes means for specifying any one of given data items of information contained in information which is being displayed, and for designating said mode in which both registration and retrieval of information corresponding to a specified given data item of information into and from another of said storing means is to be executed while said displaying means is displaying said information stored in said one of said storing means and designated by said first designating means, and wherein said executing means includes means for executing both registration of a specified given data item of information which is being displayed into said another of said storing means and retrieval of said specified given data item of information from said another of said storing means in accordance with said mode designated by said second designating means while said displaying means is displaying said information stored in said one of said storing means.

43. The apparatus according to claim 42, wherein said information inputting means comprises at least one of a keyboard, a radio receiver and a connector which is arranged to be connected to an external apparatus through a communication cable.

44. The apparatus according to claim 42, wherein two of said plurality of storing means are an address data storing means and a schedule data storing means, respectively, and said specified data item of information is a data item relating to a personal name.

45. The apparatus according to claim 42, wherein two of said plurality of storing means are an address data storing means and a memo data storing means, respectively, and said specified data item of information is a data item relating to a personal name.

46. The apparatus according to claim 42, wherein said specified data item of information is a data item relating to a personal name.

47. The apparatus according to claim 42, wherein said executing means comprises means for enabling a registration of an another data item of said plurality of data items into said another storing means, after said registration of said specified data item into said another storing means is completed.

48. The apparatus according to claim 42, wherein said various types of information includes index data indicating the type of information, and said information inputting means receives information which is transmitted from an external device, and wherein the apparatus further includes:

means for detecting the index data in the information received by said information inputting means and for discriminating the type of said received information based on the index data detected by said detecting means; and control means for storing said received information in the corresponding one of said storing means in accordance with the type of information discriminated by said detecting means.

49. The apparatus according to claim 48, wherein said control means stores information received by said information inputting means in different storing means from said plurality of storing means, when said detecting means does not detect index data in said received information.

50. The apparatus according to claim 49, further comprising:

means for reading out said information from said different storing means; and means for formatting said information read out by said reading means such that said type of information has a plurality of data items, whereby said information is allowed to be registered in said plurality of said storing means.

51. An information managing apparatus comprising:

information inputting means for inputting function mode information of various formats used for a plurality of function modes, each function mode information including a plurality of data items in a predetermined format;

a plurality of storing means, each storing means being provided independently and correspondingly to one of said function modes and each storing means having storage areas in which said plurality of data items of information of a corresponding format are stored, and for storing information input from said information inputting means;

means for displaying selectively said function mode information of various formats;

first mode selecting means for selecting one of said plurality of function modes to selectively display information stored in storage areas of one of said storing means which corresponds to the selected one function mode on said displaying means;

second mode selecting means for selecting one of a plurality of processing modes while one of said plurality of function modes is selected, and said plurality of processing modes include registration of pieces of information which is selected by said first mode selecting means and being displayed into a different storing means of said plurality of storing means different from the one storing means which corresponds to the selected function mode by said first mode selecting means and retrieval of information corresponding to information which is selected by said first mode selecting means and being displayed from the different storing means of said plurality of storing means different from the one storing means which corresponds to the selected function mode by said first mode selecting means; and means for enabling said first mode selecting means and said second mode selecting means to independently operate, and for executing both said registration and said retrieval while said one of said function modes is being selected, without changing of mode selection by said first mode selecting means.

52. The apparatus according to claim 51, wherein said plurality of function modes includes at least one of address note function, schedule function and memo function.

53. The apparatus according to claim 51, wherein said information inputting means comprises at least one of a keyboard, a radio receiver and a connector which is arranged to be connected to an external apparatus through a communication cable.

54. The apparatus according to claim 51, wherein said enabling means executes said registration of information, using one of said data items included in said information of said one of said function modes.

55. The apparatus according to claim 54, wherein said displaying means displays registered information.

56. The apparatus according to claim 51, wherein said various types of information includes index data indicating the type of information, and said information inputting means receives information which is transmitted from an external device, and wherein the apparatus further includes:

means for detecting the index data in the information received by said information inputting means and for discriminating the type of said received information based on the index data detected by said detecting means; and control means for storing said received information in the corresponding one of said storing means in accordance with the type of information discriminated by said detecting means.

57. The apparatus according to claim 56, wherein said control means stores information received by said information inputting means in different storing means from said plurality of storing means, when said detecting means does not detect index data in said received information.

58. The apparatus according to claim 57, further comprising:

means for reading out said information from said different storing means; and means for formatting said information read out by said reading means such that said type of information has a plurality of data items, whereby said information is allowed to be registered in said plurality of said storing means.

59. The apparatus according to claim 51, wherein said specified data item of information is a data item relating to a personal name.

60. The apparatus according to claim 51, wherein said executing means comprises means for enabling a registration of an another data item of said plurality of data items into said another storing means, after said registration of said specified data item into said another storing means is completed.

61. An information managing apparatus comprising:

information inputting means for inputting function mode information of various formats used for a plurality of function modes, each function mode information including a plurality of data items in a predetermined format;

a plurality of storing means, each storing means being provided independently and correspondingly to one of said function modes and each storing means having storage areas in which said plurality of data items of information of a corresponding format are stored, and for storing information input from said information inputting means;

means for displaying selectively said function mode information of various formats;

first mode selecting means for selecting one of said plurality of function modes to selectively display information stored in storage areas of one of said storing means which corresponds to the selected one function mode on said displaying means;

second mode selecting means for selecting one of a plurality of processing modes while one of said plurality of function modes is selected, and said plurality of processing modes include retrieval mode in which retrieval of information corresponding to information which is selected by said first mode selecting means and being displayed from at least two of said plurality of storing means different from the one storing means which corresponds to a selected function mode; and means for enabling said first mode selecting means and said second mode selecting means to independently operate, and for executing said retrieval of information while information of said one of said function modes is being displayed, without changing of mode selection by said first mode selecting means.

62. The apparatus according to claim 61, wherein said plurality of function modes includes at least one of address note function, schedule function and memo function.

63. The apparatus according to claim 61, wherein said information inputting means comprises at least one of a keyboard, a radio receiver and a connector which is arranged to be connected to an external apparatus through a communication cable.

64. The apparatus according to claim 61, wherein said specified data item of information is a data item relating to a personal name.

65. The apparatus according to claim 61, wherein said executing means executes retrieval of information from said at least two of said storing means, respectively.

66. The apparatus according to claim 61, wherein said enabling means executes said retrieval of information using one of said data items included in said information of said one of said function modes.

67. The apparatus according to claim 66, wherein said displaying means displays retrieved information.

68. The apparatus according to claim 61, wherein said various types of information includes index data indicating the type of information, and said information inputting means receives information which is transmitted from an external device, and where the apparatus further includes:

means for detecting the index data in the information received by said information inputting means and for discriminating the type of said received information based on the index data detected by said detecting means; and control means for storing said received information in the corresponding one of said storing means in accordance with the type of information discriminated by said detecting means.

69. The apparatus according to claim 68, wherein said control means stores information received by said information inputting means in different storing means from said plurality of storing means, when said detecting means does not detect index data in said received information.

70. The apparatus according to claim 69, further comprising:

means for reading out said information from said different storing means; and means for formatting said information read out by said reading means such that said type of information has a plurality of data items, whereby said information is allowed to be registered in said plurality of said storing means.

71. An information managing apparatus comprising:

information inputting means for inputting function mode information of various formats used for a plurality of function modes, each function mode information including a plurality of data items in a predetermined format;

a plurality of storing means for storing information input from said information inputting means;

means for displaying selectively said function mode information of various formats;

first mode selecting means for selecting one of said plurality of function modes to selectively display information stored in one of said storing means which corresponds to a selected function mode on said displaying means;

second mode selecting means for selecting one of a plurality of processing modes while one of said plurality of function modes is selected, and said plurality of processing modes include registration of pieces of information which is selected by said first mode selecting means and being displayed into a different storing means of said plurality of storing means different from the one storing means which corresponds to the selected function mode by said first mode selecting means and retrieval of information corresponding to information which is selected by said first mode selecting means and being displayed from the different storing means of said plurality of storing means different from the one storing mean which corresponds to the selected function mode by said first mode selecting means; and means for enabling said first mode selecting means and said second mode selecting means to operate independently of each other;

wherein each of said plurality of storing means is provided independently and correspondingly to one of said function modes, and each of said plurality of storing means has a plurality of storage areas in which said plurality of data items of information of a corresponding format are stored, wherein said process mode selecting means include means for processing information stored in storage areas of a different storing means of said plurality of storing means, which different storing means corresponds to a selected different function mode, while information of said one of said function modes is being displayed on said displaying means, and wherein said enabling means includes means for executing both registration and retrieval of information of said different function mode of said plurality of function modes while information of said one of said function modes is being displayed on said displaying means.

72. The apparatus according to claim 71, wherein said enabling means executes said registration and said retrieval of information using one of said data items included in said information of said one of said function modes.

73. The apparatus according to claim 72, wherein said displaying means displays registered/retrieved information.

74. The apparatus according to claim 71, wherein said plurality of function modes includes at least one of address note function, schedule function and memo function.

75. The apparatus according to claim 71, wherein said information inputting means comprises at least one of a keyboard, a radio receiver and a connector which is arranged to be connected to an external apparatus through a communication cable.

76. The apparatus according to claim 71, further comprising:

means for reading out said information from said different storing means; and means for formatting said information read out by said reading means such that said type of information has a plurality of data items, whereby said information is allowed to be registered in said plurality of said storing means.

77. The apparatus according to claim 71, wherein said specified data item of information is a data item relating to a personal name.

78. The apparatus according to claim 71, wherein said executing means comprises means for enabling a registration of an another data item of said plurality of data items into said another storing means, after said registration of said specified data item into said another storing means is completed.

79. The apparatus according to claim 78, wherein said various types of information includes index data indicating the type of information, and said information inputting means receives information which is transmitted from an external device, and where the apparatus further includes:

means for detecting the index data in the information received by said information inputting means and for discriminating the type of said received information based on the index data detected by said detecting means; and control means for storing said received information in the corresponding one of said storing means in accordance with the type of information discriminated by said detecting means.

80. The apparatus according to claim 79, wherein said control means stores information received by said information inputting means in different storing means from said plurality of storing means, when said detecting means does not detect index data in said received information.

\* \* \* \* \*